US010200945B2

(12) United States Patent
Lopes et al.

(10) Patent No.: US 10,200,945 B2
(45) Date of Patent: Feb. 5, 2019

(54) SYSTEMS AND METHODS FOR MANAGING MOBILITY OF USERS IN A NETWORK OF MOVING THINGS AT THE EDGE

(71) Applicant: Veniam, Inc., Mountain View, CA (US)

(72) Inventors: Diogo Miguel Augusto Lopes, Aveiro (PT); Tiago Silvestre Condeixa, Aveiro (PT); Ricardo Jorge Magalhães de Matos, Porto (PT)

(73) Assignee: Veniam, Inc., Mountain View, CA (US)

( * ) Notice: Subject to any disclaimer, the term of this patent is extended or adjusted under 35 U.S.C. 154(b) by 0 days.

(21) Appl. No.: 15/456,447

(22) Filed: Mar. 10, 2017

(65) Prior Publication Data

US 2017/0311249 A1    Oct. 26, 2017

Related U.S. Application Data

(60) Provisional application No. 62/326,277, filed on Apr. 22, 2016.

(51) Int. Cl.
| | |
|---|---|
| *H04W 48/20* | (2009.01) |
| *H04W 76/30* | (2018.01) |
| *H04W 76/11* | (2018.01) |
| *H04L 29/12* | (2006.01) |
| *H04W 8/26* | (2009.01) |

(Continued)

(52) U.S. Cl.
CPC ......... *H04W 48/20* (2013.01); *H04L 61/2007* (2013.01); *H04W 8/26* (2013.01); *H04W 48/10* (2013.01); *H04W 76/11* (2018.02); *H04W 76/30* (2018.02); *H04L 61/103* (2013.01);

(Continued)

(58) Field of Classification Search
CPC .............. H04L 61/2007; H04L 61/103; H04L 61/2015; H04W 48/10; H04W 48/20; H04W 84/005; H04W 88/08; H04W 8/26; H04W 76/021; H04W 76/06; H04W 76/11; H04W 76/30
See application file for complete search history.

(56) References Cited

U.S. PATENT DOCUMENTS

| | | | | |
|---|---|---|---|---|
| 5,884,176 A | * | 3/1999 | Vaara ..................... | H04W 36/04 455/438 |
| 6,438,377 B1 | * | 8/2002 | Savolainen ........... | H04W 36/30 370/332 |

(Continued)

FOREIGN PATENT DOCUMENTS

| | | |
|---|---|---|
| WO | 2015019234 | 2/2015 |
| WO | 2015075569 | 5/2015 |

OTHER PUBLICATIONS

Int'l Search Report and Written Opinion for PCT/US17/028151 dated Jun. 29, 2017 (13 pages).

*Primary Examiner* — Steven H Nguyen
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes that maintain connectivity support for mobility of end-user devices.

27 Claims, 19 Drawing Sheets

(51) Int. Cl.
*H04W 48/10* (2009.01)
*H04W 84/00* (2009.01)
*H04W 88/08* (2009.01)

(52) U.S. Cl.
CPC ....... *H04L 61/2015* (2013.01); *H04W 84/005* (2013.01); *H04W 88/08* (2013.01)

(56) References Cited

U.S. PATENT DOCUMENTS

| | | | | |
|---|---|---|---|---|
| 7,483,995 B2 * | 1/2009 | Abhishek | H04W 36/0055 | 370/338 |
| 7,542,765 B2 * | 6/2009 | Kwun | H04W 28/18 | 370/331 |
| 7,697,549 B2 * | 4/2010 | Eran | H04J 13/0048 | 370/338 |
| 7,706,326 B2 * | 4/2010 | Marinier | H04W 28/18 | 370/331 |
| 7,826,426 B1 * | 11/2010 | Bharghavan | H04W 36/18 | 370/328 |
| 8,037,305 B2 * | 10/2011 | Rahman | H04L 63/162 | 380/270 |
| 8,191,785 B2 * | 6/2012 | Qu | H04W 36/385 | 235/462.07 |
| 8,204,039 B2 * | 6/2012 | Beach | H04L 45/02 | 370/238 |
| 8,223,721 B2 * | 7/2012 | Berglund | H04W 36/0055 | 370/332 |
| 8,451,752 B2 * | 5/2013 | Lu | H04L 12/4633 | 370/254 |
| 8,964,595 B2 * | 2/2015 | Agarwal | H04W 24/08 | 370/252 |
| 9,264,961 B1 * | 2/2016 | Shah | H04W 36/0072 | |
| 9,479,990 B1 * | 10/2016 | Chen | H04W 36/30 | |
| 2004/0063455 A1 * | 4/2004 | Eran | H04J 13/0048 | 455/525 |
| 2006/0056348 A1 * | 3/2006 | Marinier | H04W 28/18 | 370/331 |
| 2006/0200678 A1 * | 9/2006 | Yamada | H04L 9/0833 | 713/182 |
| 2006/0251021 A1 * | 11/2006 | Nakano | H04W 36/0038 | 370/331 |
| 2007/0015511 A1 * | 1/2007 | Kwun | H04W 36/30 | 455/436 |
| 2007/0070959 A1 * | 3/2007 | Almeroth | H04W 40/28 | 370/338 |
| 2007/0150732 A1 * | 6/2007 | Suzuki | H04W 12/06 | 713/168 |
| 2007/0248065 A1 * | 10/2007 | Banerjea | H04L 45/26 | 370/338 |
| 2007/0249347 A1 * | 10/2007 | Saifullah | H04W 36/38 | 455/436 |
| 2008/0009307 A1 * | 1/2008 | Sekhar | H04W 48/10 | 455/524 |
| 2008/0112362 A1 * | 5/2008 | Korus | H04L 29/12811 | 370/331 |
| 2008/0186933 A1 * | 8/2008 | Willman | H04W 88/02 | 370/338 |
| 2008/0198811 A1 * | 8/2008 | Deshpande | H04W 48/16 | 370/332 |
| 2008/0209070 A1 * | 8/2008 | Horn | H04L 29/06 | 709/238 |
| 2009/0046573 A1 * | 2/2009 | Damnjanovic | H04J 11/0093 | 370/216 |
| 2009/0097451 A1 * | 4/2009 | Gogic | H04W 36/30 | 370/331 |
| 2009/0190522 A1 * | 7/2009 | Horn | H04W 40/30 | 370/315 |
| 2010/0039947 A1 * | 2/2010 | Li | H04L 1/0026 | 370/252 |
| 2010/0061335 A1 * | 3/2010 | Kannan | H04W 36/0077 | 370/331 |
| 2010/0135252 A1 * | 6/2010 | Forte | H04W 36/0016 | 370/331 |
| 2010/0165968 A1 * | 7/2010 | Shpak | H04J 13/0048 | 370/338 |
| 2010/0260146 A1 * | 10/2010 | Lu | H04L 12/4633 | 370/331 |
| 2011/0019649 A1 * | 1/2011 | Dayal | G01S 5/10 | 370/336 |
| 2011/0044177 A1 * | 2/2011 | Nair | H04L 41/12 | 370/241 |
| 2011/0307119 A1 | 12/2011 | Basir et al. | | |
| 2012/0233657 A1 | 9/2012 | Guevin et al. | | |
| 2013/0272269 A1 * | 10/2013 | Srivastava | H04W 36/30 | 370/332 |
| 2014/0040016 A1 | 2/2014 | Amla et al. | | |
| 2014/0254471 A1 * | 9/2014 | Fang | H04W 84/047 | 370/315 |
| 2014/0293885 A1 | 10/2014 | Agrawal et al. | | |
| 2014/0301368 A1 * | 10/2014 | Chen | H04W 36/0083 | 370/331 |
| 2014/0362713 A1 * | 12/2014 | Agarwal | H04W 24/08 | 370/252 |
| 2015/0124641 A1 * | 5/2015 | MacDonald | H04W 16/00 | 370/254 |
| 2015/0172941 A1 * | 6/2015 | Agarwal | H04W 24/08 | 370/253 |
| 2015/0372724 A1 * | 12/2015 | Deng | H04B 7/024 | 375/299 |
| 2016/0309524 A1 * | 10/2016 | Barreto De Miranda Sargento | H04W 76/10 | |

* cited by examiner

SYSTEMS AND METHODS FOR MANAGING MOBILITY OF USERS IN A NETWORK OF MOVING THINGS AT THE EDGE

CROSS-REFERENCE TO RELATED APPLICATIONS/INCORPORATION BY REFERENCE

This patent application makes reference to, claims priority to, and claims benefit from U.S. Provisional Patent Application Ser. No. 62/326,277, filed on Apr. 22, 2016, and titled "Systems and Methods for Managing Mobility of Users in a Network of Moving Things at the Edge," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; U.S. Provisional Application Ser. No. 62/299,269, titled "Systems and Methods for Automating and Easing the Installation and Setup of the Infrastructure Supporting a Network of Moving Things," filed on Feb. 24, 2016; and U.S. Provisional Application Ser. No. 62/326,267, titled Systems and Methods for Managing Mobility of Users in Network of Moving Things at the Backhaul," filed on Apr. 22, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
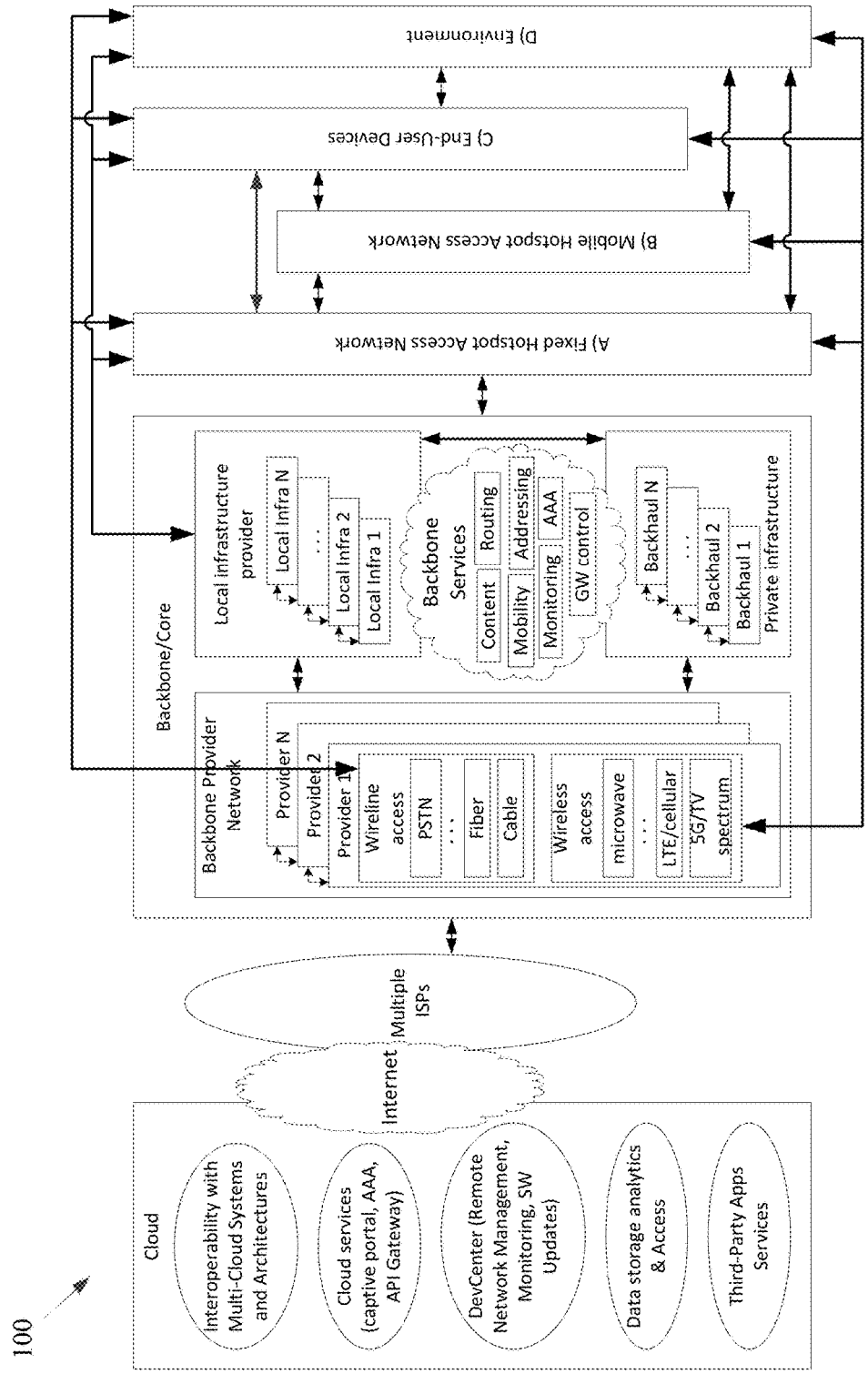
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals. Such a network of moving things supports management of mobility of end-users.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., global navigation satellite system (GNSS)/Global Positioning System (GPS), etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/

Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
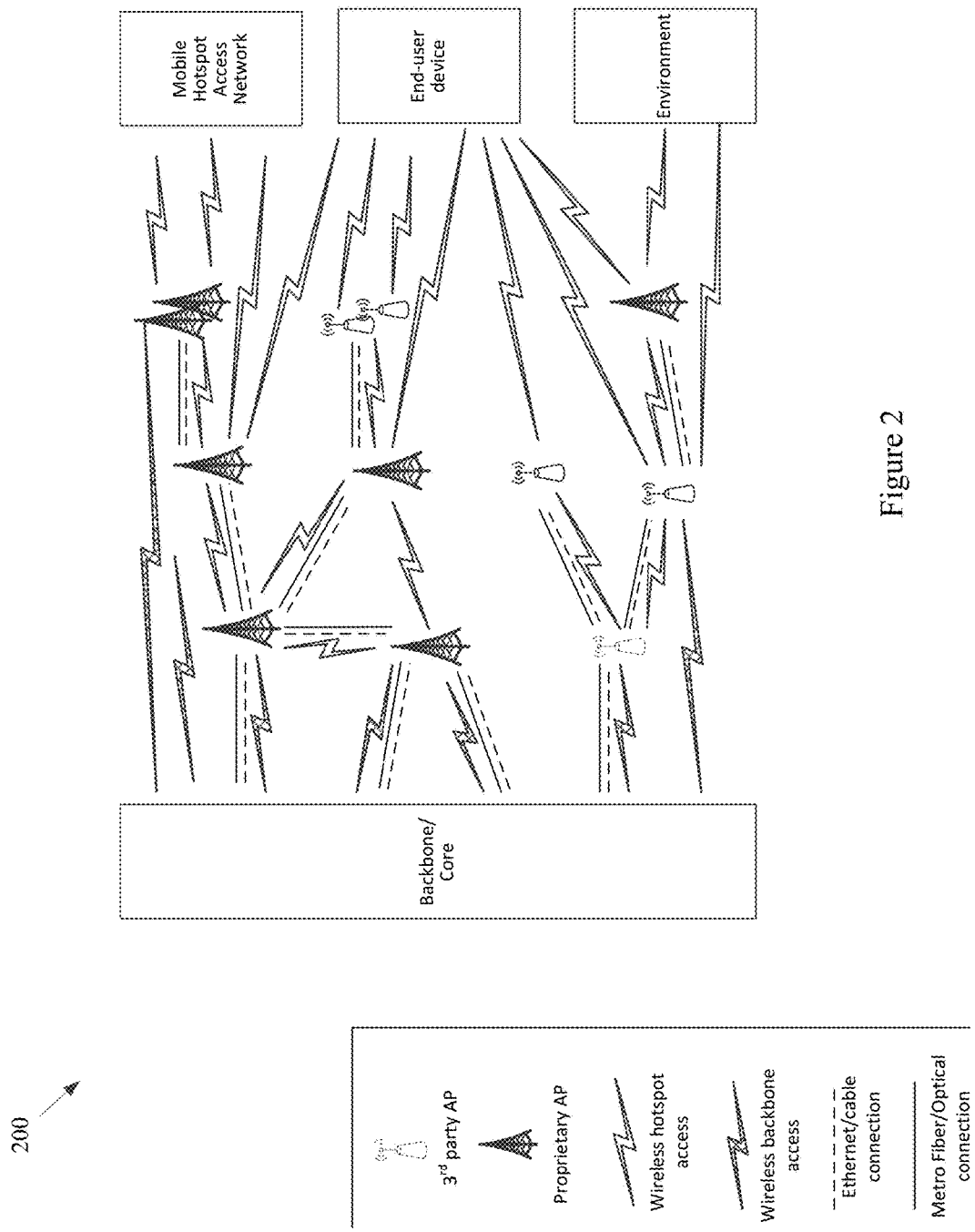
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
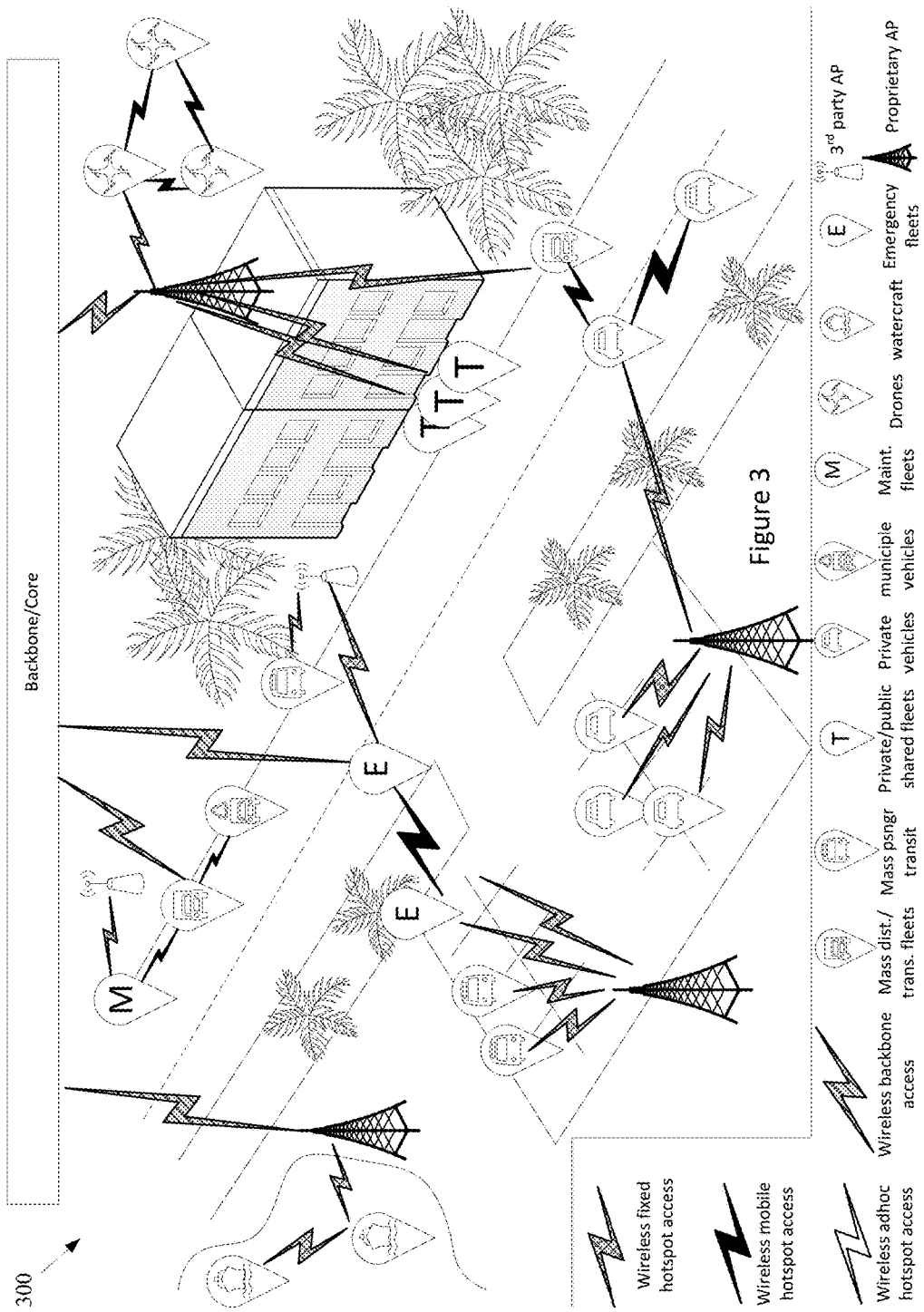
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
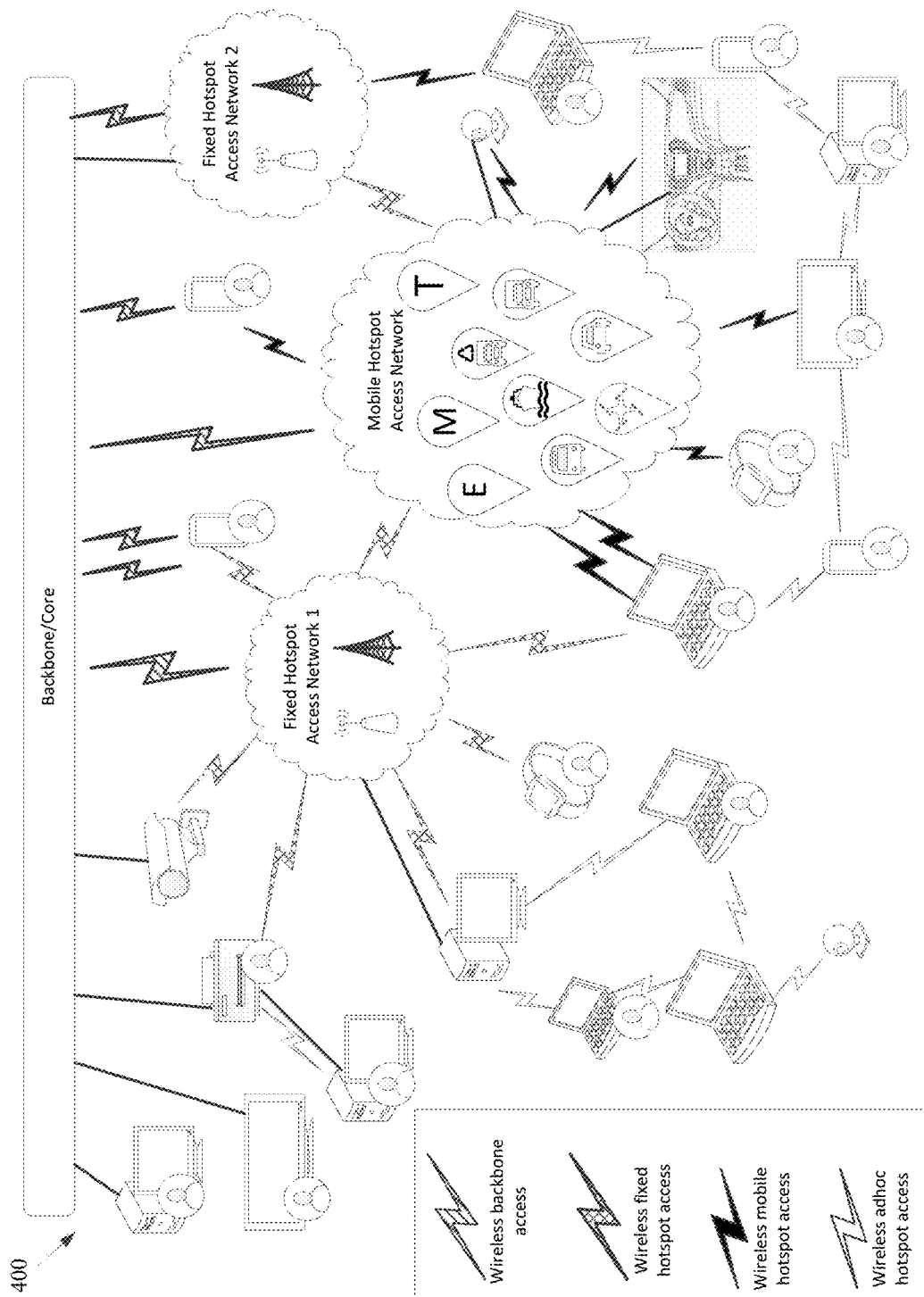
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
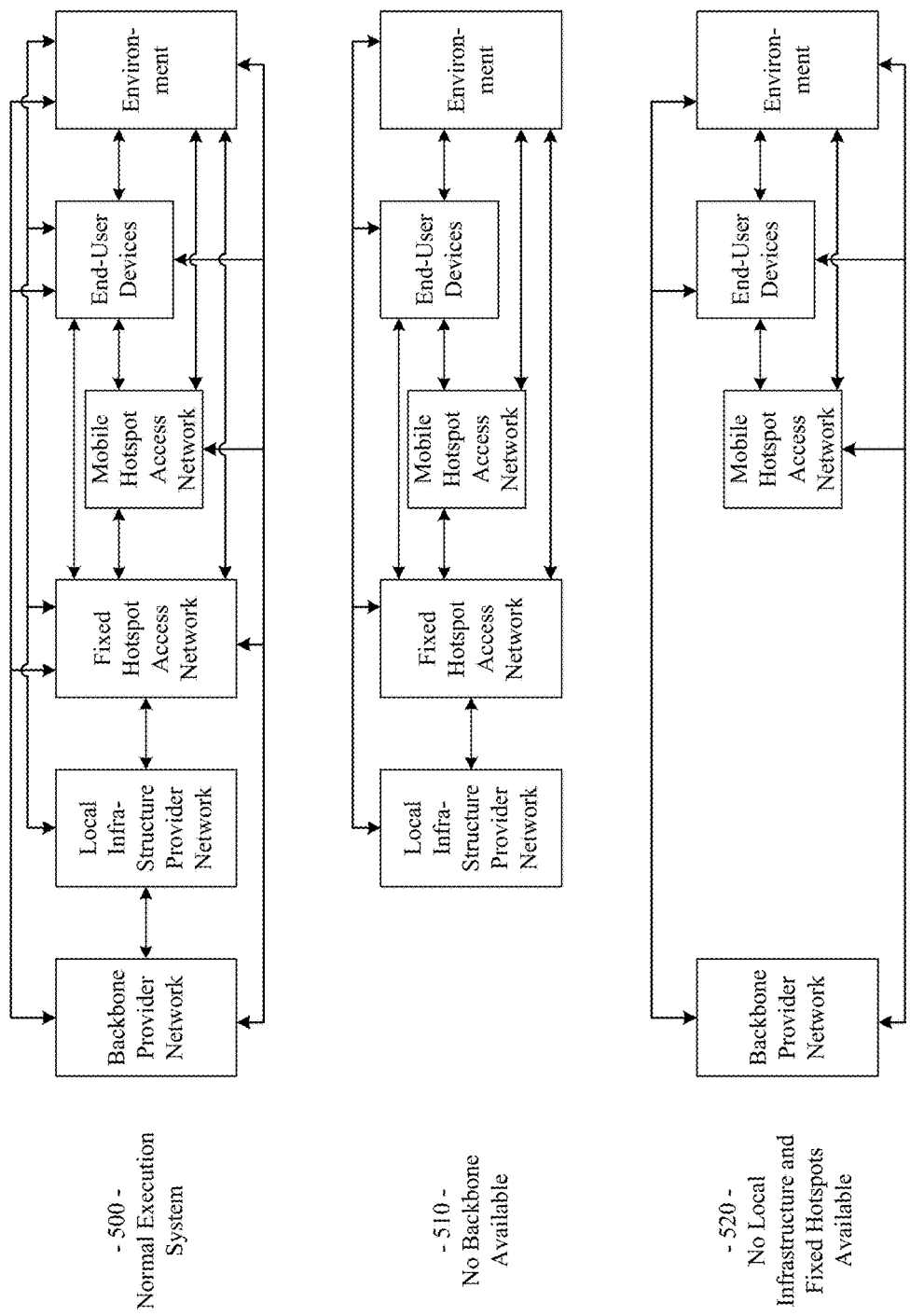
FIGS. 5A-5C show a plurality of network configurations illustrating the flexibility and/or and resiliency of a communication network, in accordance with various aspects of this disclosure.
Figure 5B:
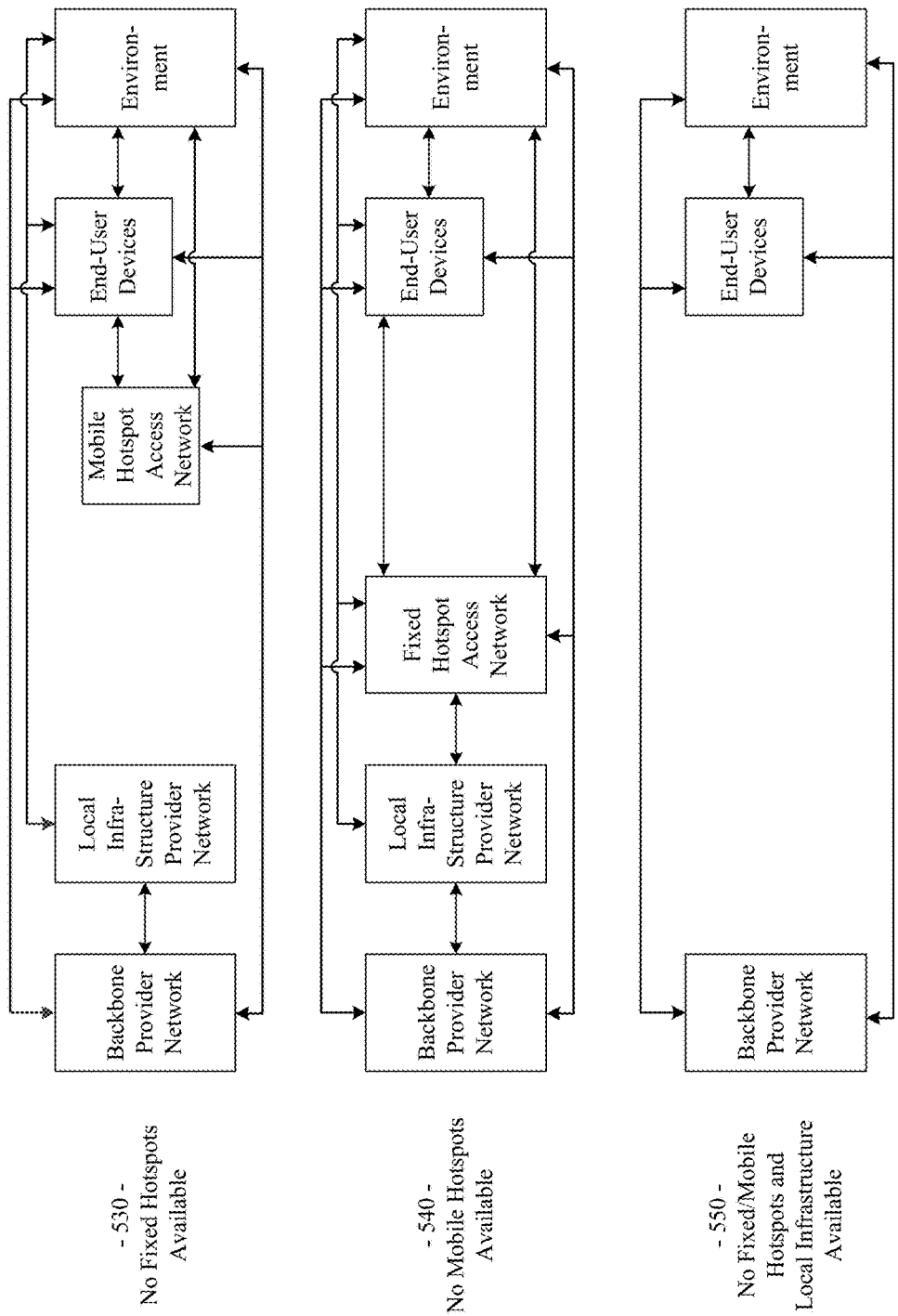
Figure 5C:
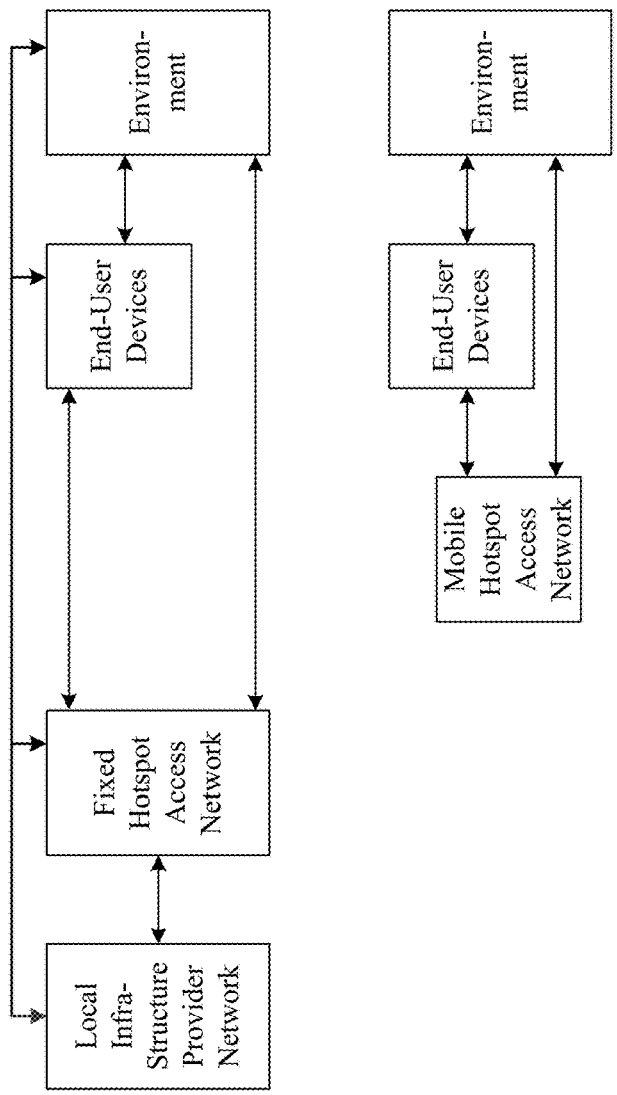

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., radio frequency (RF) link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
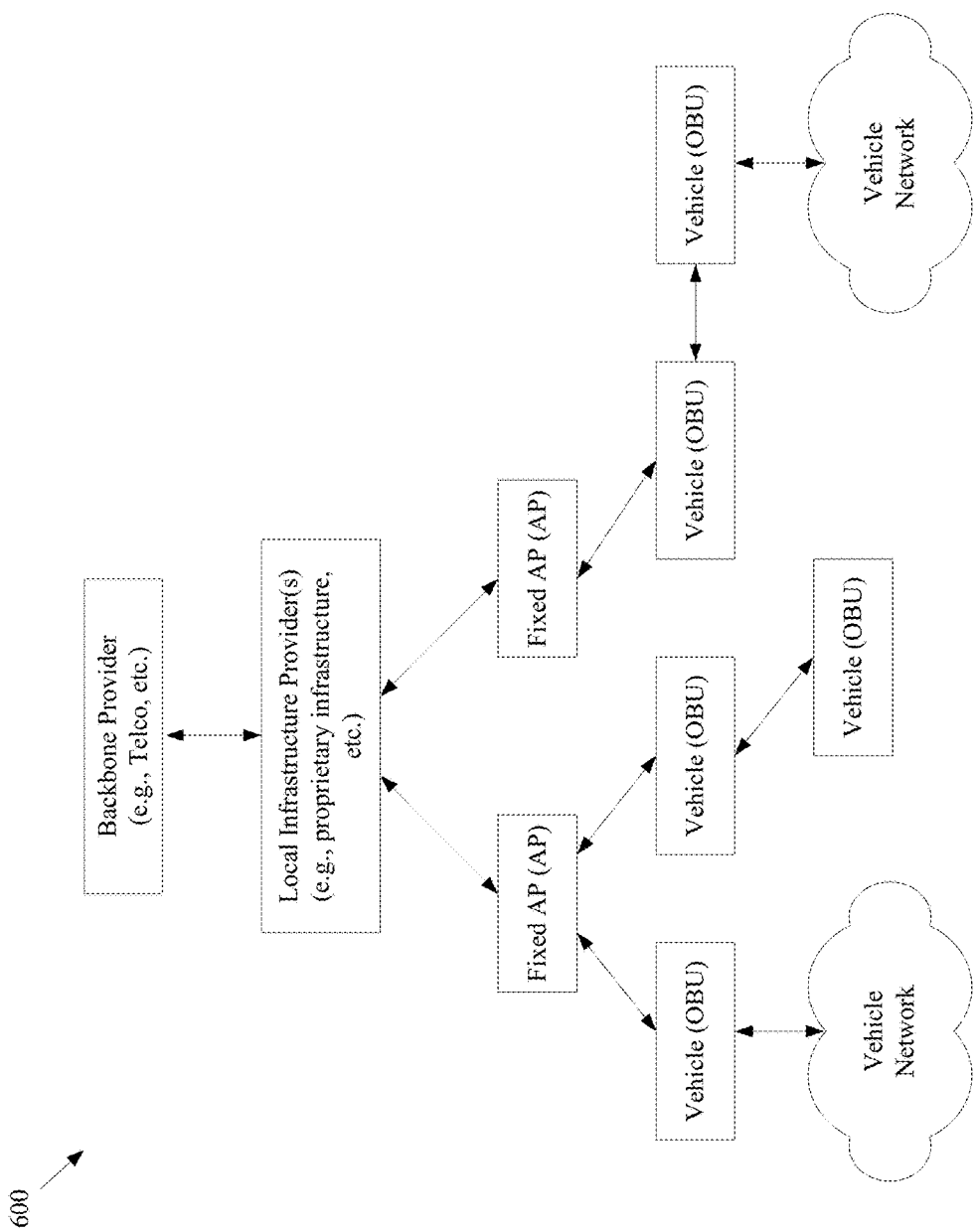
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., IEEE 802.11p, cellular, Wi-Fi (e.g., IEEE 802.11a/b/g/n/ac/ad), etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller (NC), may monitor the location (e.g., network location, etc.) of various nodes (e.g., Mobile APs, etc.) and/or the location of end users connected through them. The mobility controller (MC/NC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

Aspect of this disclosure enable a network of moving things in which end-users are connected to the Internet all the time without noticing any disruptions in their service, despite mobility of the end-user devices, despite the mobility of at least some of the access points (e.g., one or more mobile APs (MAPs)), and despite the very dynamic and dense environments that are to be expected in such a network. For example, aspects of this disclosure enable uninterrupted flows of data to/from the end-user device such as, for example, a voice-over-Internet Protocol (VoIP) call, a connection to a streaming video server, browsing of Internet web sites, etc., even while the end-user device is moving within the network (e.g. changing from being connected via a fixed AP at a bus stop to a mobile AP of a bus the user is boarding, or, as a more extreme example, repeatedly switching from one mobile AP to another as the mobile APs pass by the end-user standing on the sidewalk). Without such seamless mobility, the Internet or other network connection of the end-user device will drop as s/he moves between points of wireless access to the network, resulting in the need to refresh loading of pages, restart downloads, reconnect dropped VoIP calls, etc. Providing this seamless mobility to end-user devices means enabling seamless mobility among different fixed APs and/or other backhaul technologies of the mobile APs that serve the end-user devices, and also the seamless mobility of end-user devices among the mobile APs.

Aspects of this disclosure provide methods and systems for the negotiation, between access points (e.g., mobile APs and fixed APs), the "ownership" of end-user devices, which means that when an end-user device switches between, for example, a fixed AP serving a bus stop and a mobile AP of a bus, or between a mobile AP of a first bus and a mobile AP of a second bus, the network is able to detect and properly handle this mobility. To this end, the APs of a network in accordance with aspects of the present disclosure may be operable to negotiate among themselves, to determine which of the APs is going to maintain the end-user wireless connection. The process of negotiation may comprise, for example, predicting the best new access point through which to connect a specific end-user device, and communicating information between network elements in order to synchronize the APs so that the APs are able to make decisions that provide the best wireless service performance for the end-user device. The APs of such a network may provide "make-before-break" solutions that allow the APs to probe and evaluate possible new wireless connections before an existing wireless connection is removed. The APs may be configured with defined thresholds/mechanisms that prevent constant changing (e.g., oscillation or "ping-pong") of the wireless connection between the end-user device and two or more access points.

Managing seamless Wi-Fi mobility is a difficult task, because the Wi-Fi standards (e.g., IEEE 802.11a/b/g/n/ac/ad) were not designed for dynamic scenarios in which connected devices may move between access points during a communication session, without loss of data. One possible solution to support mobility is to manage end-user device mobility at OSI layer 2, where all APs broadcast the same L2 domain. For example, end-user device mobility may be based upon the use of updates to what is commonly referred to as an "ARPtable." An "ARPtable" may store one or more Internet Protocol (IP) addresses in association with their corresponding media access control (MAC) addresses, which enables a network device to communicate IP packets with other network devices over an Ethernet link using IP addresses. Such ARPtable updates may be done relatively quickly. However, extending L2 domains over Wi-Fi links with a high number of end-users devices may provide an unacceptable end-user experience. By sharing the same L2 domain, all broadcast traffic on one AP may be replicated to all other APs, resulting in what is referred to herein as a "broadcast storm." Such network activity may have significant impacts on quality of service (QoS). Accordingly, various aspects of the present disclosure provide methods and systems for handling mobility at OSI layer 3, thereby avoiding the L2 problems and insuring better QoS for the users.

As described in the above-incorporated provisional applications, the network may comprise a network controller (NC, or "mobility controller," MC), one or more mobile access points (MAPs), and one or more end-user devices (e.g., smartphones, tablets, laptops, etc.).

Figure 7:
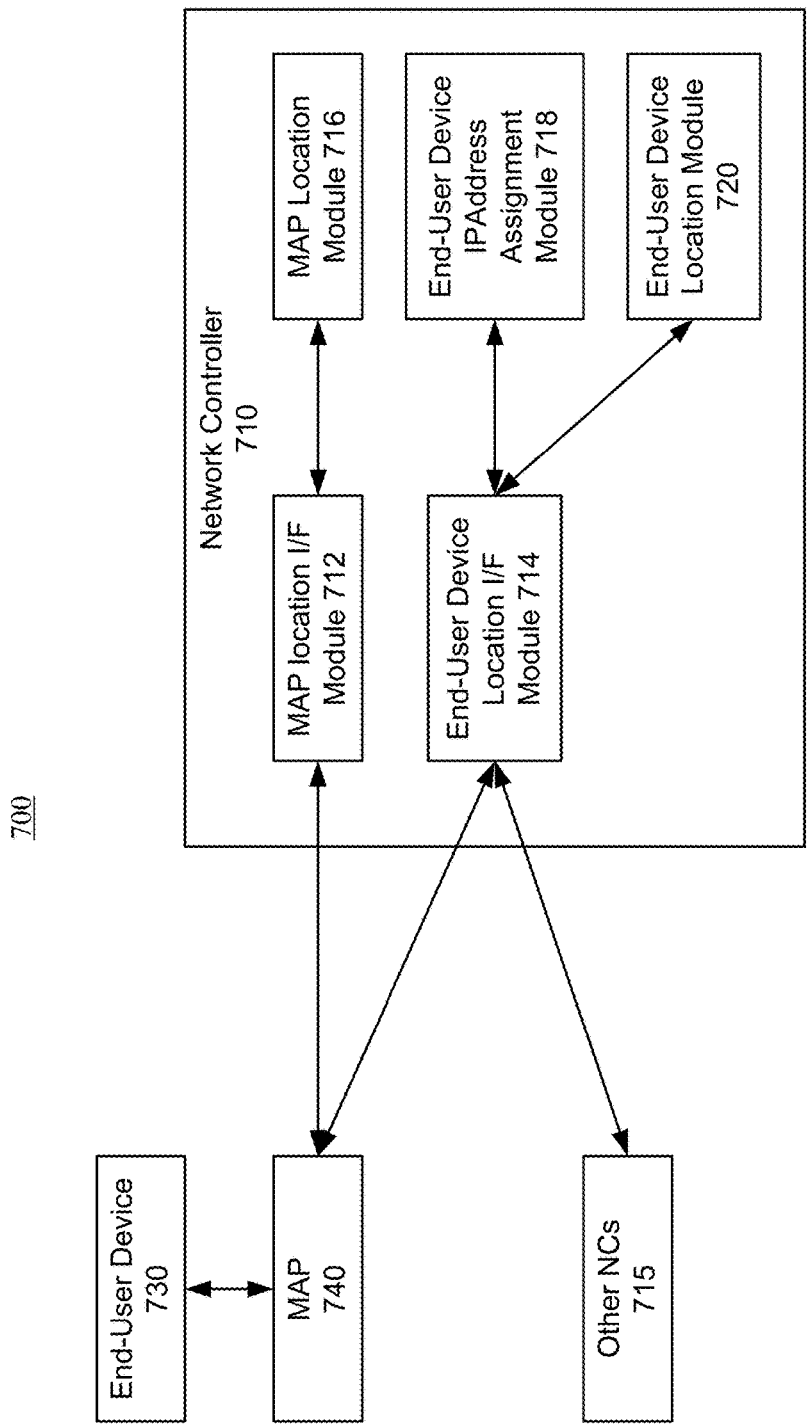
FIG. 7 is a block diagram illustrating the functional elements of an example network controller (NC), in accordance with various aspects of the present disclosure.

FIG. 7 is a block diagram illustrating the functional elements of an example network controller (NC) 710, in accordance with various aspects of the present disclosure. An NC such as the NC 710 of FIG. 7 may be responsible for managing both MAP location and end-user device location within the network. A network controller in accordance with various aspects of the present disclosure manages the location of elements of the network of moving things (e.g., mobile elements such as MAPs and end-user devices) so that when the NC receives data traffic from the another network (e.g., the Internet) that is destined for an element of the network of the present disclosure (i.e., a MAP/OBU and/or end-user device of the network of moving things), the NC uses the location within the network where this MAP/OBU and/or end-user device is currently connected (which may, for example, be considered an analogy to its actual geographic location), so that the information packets may be forwarded through the network to destination network element. For example, assuming a situation in which a device of a User A is currently connected to a MAP B that is communicating with a NC D via a FAP C, the NC D, in accordance with aspects of the present disclosure, may forward received packet traffic destined for User A through FAP C to MAP B, and from there on to the device of User A. Each NC of a network of moving things in accordance with aspects of the present disclosure may track the locations of a set of MAPs/OBUs and end-user devices assigned to the NC, using methods and systems described herein and in the above-incorporated provisional applications.

As depicted in FIG. 7, the NC 710 comprises a MAP location interface (I/F) module 712 that communicates with one or more MAPs (e.g., MAP 740), each of which may wirelessly communicate with one or more end-user devices (e.g., end-user device 730). The MAP location I/F module 712 may periodically communicate with each of the MAPs assigned to the MAP location I/F module 712, to keep track of the movement of the MAPs. In addition, the NC 710 comprises an end-user device location interface (I/F) module 714 that may be responsible for location-related message processing for end-user devices (e.g., end-user device 730, such as a smartphone, tablet, laptop, camera, etc.), and may communicate location information to the other network controllers of the network of moving things, shown in FIG. 7 as other NCs 715. The NC 710 may also comprise a MAP location module 716 that communicates with the MAP location interface (I/F) module 712. In accordance with aspects of the present disclosure, the MAP location module 716 may act as a database that stores information regarding the location of all MAPs assigned to the NC 710. The NC 710 of FIG. 7 also comprises an end-user device IP address assignment module 718 that may be responsible for managing one or more pools of IP addresses to be assigned or allocated to MAPs. The NC 710 may also comprises an end-user device location module 720 that may be responsible for keeping track of the current location of the end-user device within the entirety of the network of moving things. In accordance with aspects of the present disclosure, each MAP (e.g., MAP 740) in a network of moving things may have one or more end-user devices wirelessly connected to the MAP (e.g., end-user device 730), and such end-user devices may switch their wireless connection/association between two or more MAPs of the network, even when the two or more MAPs are not assigned to the same NC (e.g., NC 710). The assignment of a MAP to an NC is discussed in greater detail below.

In a network of moving things in accordance with the present disclosure, the NC is responsible for managing both MAP location and end-user device location within the network. Each NC has a set of MAPs assigned to the NC, and each NC keeps track of the locations of the MAPs assigned to the NC using methods and systems described herein and in the above-incorporated provisional applications.

Figure 8:
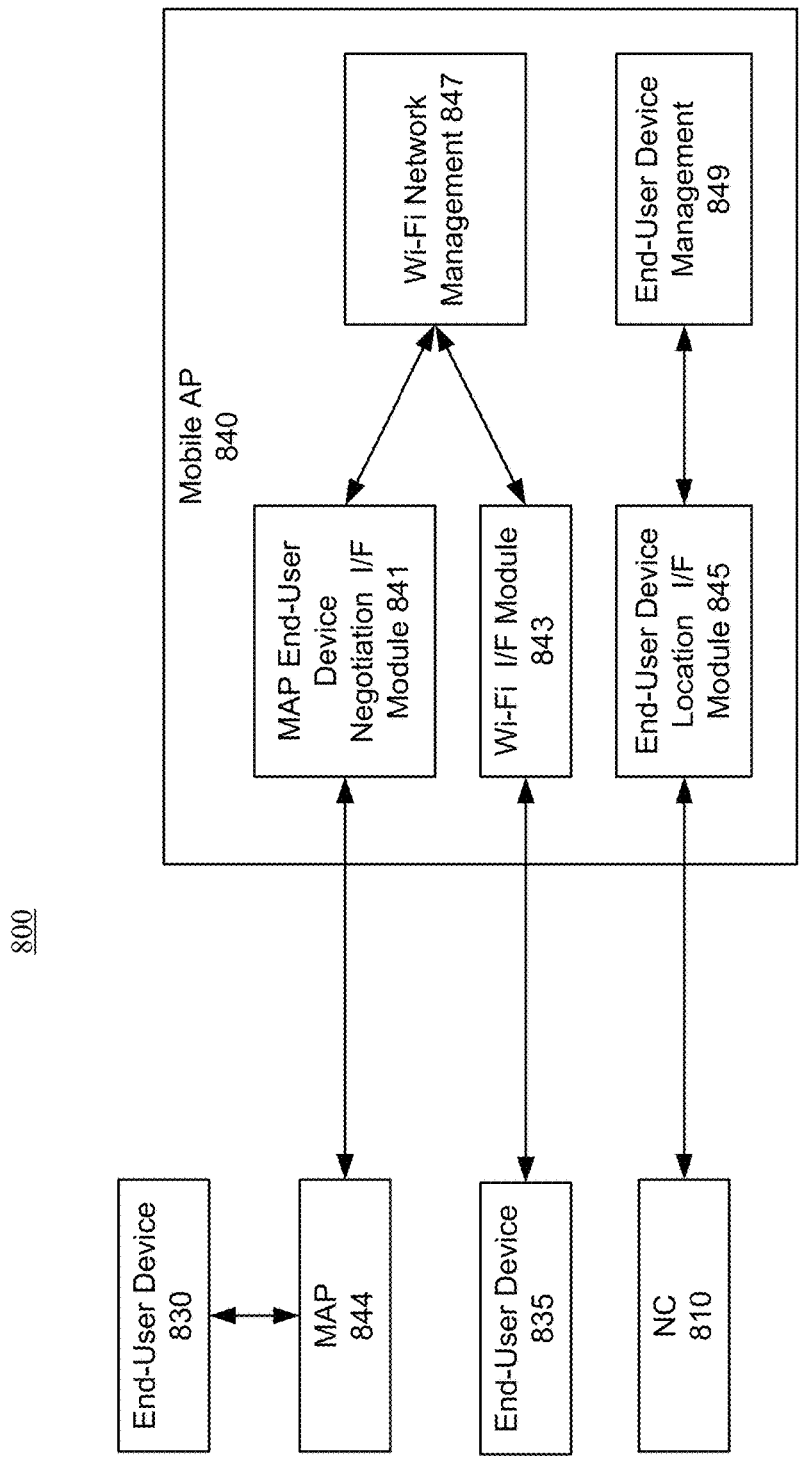
FIG. 8 shows a block diagram illustrating the functional elements of an example mobile access point (MAP), in accordance with various aspects of the present disclosure.

FIG. 8 shows a block diagram illustrating the functional elements of an example mobile access point (MAP) 840, in accordance with various aspects of the present disclosure. The MAP 840 of FIG. 8 may correspond, for example, to the MAP 730 of FIG. 7, or the MAPs described above with regard to FIGS. 1-6. As shown in FIG. 8, an example MAP 840 may comprise a MAP end-user device negotiation I/F module 841 that is responsible for performing negotiation between MAPs such as, for example, the MAP 840 and a neighboring MAP 844. The MAP 840 may also comprise a Wi-Fi I/F module 843 that is responsible for managing wireless interactions of the MAP 840 with the currently active Wi-Fi networks. The MAP 840 of FIG. 8 also comprises an end-user device location I/F module 845 that is responsible for processing messages related to the location of one or more end-user devices (e.g., end-user devices 830, 835). In addition, the MAP 840 may comprises a Wi-Fi network management module 847 that is responsible for managing the Wi-Fi networks based on network information. A Wi-Fi network management module according to the present disclosure (e.g., Wi-Fi network management module 847) may, among other things, manage the Wi-Fi network(s) provided to end-user device(s) by, in part, managing the number of Service Set Identifiers (SSIDs) broadcast by the MAP (e.g., MAP 840). For each SSID that the MAP broadcasts, the Wi-Fi network management module of the MAP may, for example, manage the type of authentication in use, the type of traffic forwarding in effect, one or more Dynamic Host Configuration Protocol (DHCP) address pools, the operation of a Domain Name System (DNS) server, and manage the operation of one or more gateways. For example, one MAP/OBU may have a first SSID A for a captive portal and a corresponding DHCP pool X, a second SSID B with radius authentication and a corresponding DHCP pool Y, and a third SSID without a captive portal or authentication and with a corresponding DHCP pool Z. A MAP such as the MAP 840 may also comprise an end-user device management module 849 that provides local management of the end-user devices currently wirelessly connected to the MAP 840.

Various aspects of the present disclosure provide mobility to end-user devices moving between wireless coverage areas of APs (e.g., fixed APs (FAPs) and mobile APs (MAPs)/OBUs of FIGS. 1-8) with a minimum perceptible effect upon the operation of wireless (e.g., radio frequency (RF)) communication of the end-user device or the experience of the end-user regarding those aspects of the end-user device that involve such wireless communication via the APs. In a network of moving things in accordance with the present disclosure, wireless RF network handoffs of an end-user device between APs are seamless, and without disruption of communication of the end-user device with the various services and/or resources (e.g., the Internet) accessed via the wireless RF network provided to the end-user device by the APs. In accordance with various aspects of the present disclosure, movement of end-user devices between coverage areas of APs may be handled in a number of ways.

For example, in a first approach, the responsibility of managing the wireless connection of the end-user device with the network may be left to the end-user device, and the network simply acknowledges the location in the network at which the end-user device is connected. End-user devices that are, for example, Wi-Fi-enabled (e.g., those end-user devices configured to communicate using IEEE 802.11a/b/g/n/ac/ad) may, for example, choose to communicate with a Wi-Fi compatible network interface of an AP, by selecting an AP of the wireless network based on a search of the available APs that are within Wi-Fi wireless communication range of the end-user device. It should be noted that an AP in accordance with various aspects of the present disclosure may have a number of wireless network interfaces that are operable on various portions/channels of various radio frequency bands using various communication protocols (e.g., Wi-Fi, Bluetooth, cellular, etc.). An end-user device may, for example, choose to communicate with a given Wi-Fi enabled AP among multiple APs within wireless communication range, based on which Wi-Fi network interface of the APs provides a wireless signal having a best indication of quality (e.g., received signal strength (RSSI)), and the end-user device may then attempt to establish a wireless connection with that chosen AP. Such a Wi-Fi network interface may be broadcasting identifiers such as, for example, a wireless network identifier such as a service set identifier (SSID), and a unique basic service set identifier (BSSID). The SSID may, for example, be a string of alphanumeric characters, and the BSSID may, for example, be a MAC address of the wireless access point (WAP), which may be generated by combining a 24-bit Organization Unique Identifier (i.e., an identifier of the manufacturer) and a 24-bit identifier assigned to the radio chipset used in the WAP. The end-user device may search for another AP when the end-user device senses that the wireless connection to the AP with that BSSID is no longer satisfactory (e.g., quality is below a quality threshold), and the end-user device may give priority to compatible wireless networks having the same SSID. An end-user device may stay connected to an AP for as long as the end-user device is satisfied with the wireless connection provided by that AP having that BSSID.

In a second example approach, the selection of a suitable AP and mobility of the end-user device may be managed by the wireless network, according to various aspects of the present disclosure, and the APs (e.g., FAPs and/or MAPs) of the wireless network may communicate among themselves in order to identify which of the APs is the best/most suitable AP to provide service to a given end-user device, without a need for the end-user device to know that the point of wireless attachment of the end-user device to the network of moving things has changed. The following discussion addresses three different example implementations of a process for managing a Wi-Fi wireless connection of an end-user device from the AP (network) side. The first example implementation uses a shared SSID and multiple BSSIDs of a Wi-Fi network, the second example implementation uses a shared SSID and a shared BSSID, and the third example implementation uses a shared SSID and a per-end-user-device BSSID. It should be noted that although the following discussion focusses on details of use of a Wi-Fi compatible wireless network interfaces on the APs and end-user device, other wireless RF communication protocols may also be used by adapting the teachings provided herein to the specifics of the chosen wireless RF communication protocol.

In the first example implementation using a shared SSID and multiple BSSIDs, each Wi-Fi enabled AP may broadcast the same SSID, but any given AP may broadcast a BSSID that is unique to that AP. The various APs (e.g., FAPs and/or MAPs) may communicate wirelessly with the end-user devices using the same or different RF channels or frequency bands. In such an arrangement, the device of the end-user may include functionality that automatically chooses when to switch from one AP to another as the end-user device moves about the coverage area of the APs of the wireless network. The end-user device is most likely to connect to another AP when the wireless connection to the current serving AP is deteriorating (e.g., as indicated by a quality metric such as, for example, RSSI, a signal to noise ratio (SNR), etc. getting close to a pre-determined threshold). Because all of the APs (e.g., FAPs and/or MAPs) share a common SSID, the probability of an end-user device choosing another AP that is broadcasting the same SSID as the last serving AP is high, but it is not a certainty.

In the second example implementation, using a shared SSID and a shared BSSID, each Wi-Fi enabled network interface of an AP of the network of moving things as described herein may broadcast the same SSID and the same BSSID, and may communicate on the same RF channel/frequency band. In this arrangement, the end-user device may detect all APs (e.g., MAPs and/or FAPs) as if there is only one AP, since the BSSID broadcast by each of the APs is the same. In such an arrangement, the end-user device will stay connected when moving between the APs. However, because all APs have the same BSSID, each of the APs may receive the wireless traffic for all of the other APs, so additional traffic forwarding management between the APs may be used to enable the APs to decide which AP will handle traffic of any specific end-user device. In addition, having all APs broadcast the same BSSID and operate in the same RF channel may lead to significant interference.

In the third example implementation, using a shared SSID and a per-end-user-device BSSID, the APs of the network according to aspects of this disclosure may each broadcast multiple wireless networks having the same SSID and communicated via the same RF channel/frequency band, but where each wireless network uses a different BSSID for each end-user device. In accordance with some aspects of the present disclosure, only one end-user device may connect to each of the wireless networks corresponding to each BSSID. However, in accordance with other aspects of the present disclosure, more than one end-user device may connect to each of such wireless networks. The interference between end-user devices is reduced relative to the second example implementation having a shared SSID and a shared BSSID, described above, because the end-user devices in the third example implementation would be connected to networks with different BSSIDs. In this example implementation, when an end-user device wirelessly connects to a first AP (e.g., MAP and/or FAP) of a network of moving things according to the present disclosure, the wireless connection of the end-user device with the first AP may be associated with a specific BSSID identified in signals broadcast by the first AP and received by the end-user device. At some later time, if the network of the present disclosure senses that the quality of the wireless connection of the end-user device with the first AP is no longer satisfactory and determines that the end-user device should be moved to a second, more-suitable AP, that second AP may be instructed to begin broadcasting a wireless network identifying the BSSID associated with the connection used by the end-user device with the first AP, and the first AP may stop broadcasting the network associated with the BSSID that served the end-user device via the first AP. In this manner, the end-user device may be moved between the first AP and the second AP, without the end-user device taking part in or being aware of the "handoff" process, and the decision to move the end-user device from the first AP to the second AP may be made entirely on the network (e.g., AP) side. In such an example implementation, APs of the network still communicate on the same channel, but only one AP will receive and handle traffic for a given end-user device, thus reducing interference and management overhead.

However, if a second end-user device does connect to a given wireless network that is already in use by a first end-user device (i.e., a network with a BSSID already being used to serve the first end-user device), there is no harm done. The aim is to keep the number of end-user devices that connect to a given wireless network (having a particular assigned BSSID) as low as possible, to reduce interference. If two end-user devices do use the same wireless network of a first AP (i.e., where both end-user devices communicate using the same BSSID), when one of the end-user devices moves to a second AP and the second AP establishes a wireless network with the BSSID of the second end-user device, the first AP may be unable to remove the wireless network having that BSSID, because there is still an end-user device using the wireless network supported by the first AP. During a period of time when either the first or the second end-user device is within communication range of both the first AP and the second AP, both the first AP and the second AP will receive traffic from the end-user device, but in accordance with aspects of the present disclosure, only one AP will forward such traffic.

Figure 9:
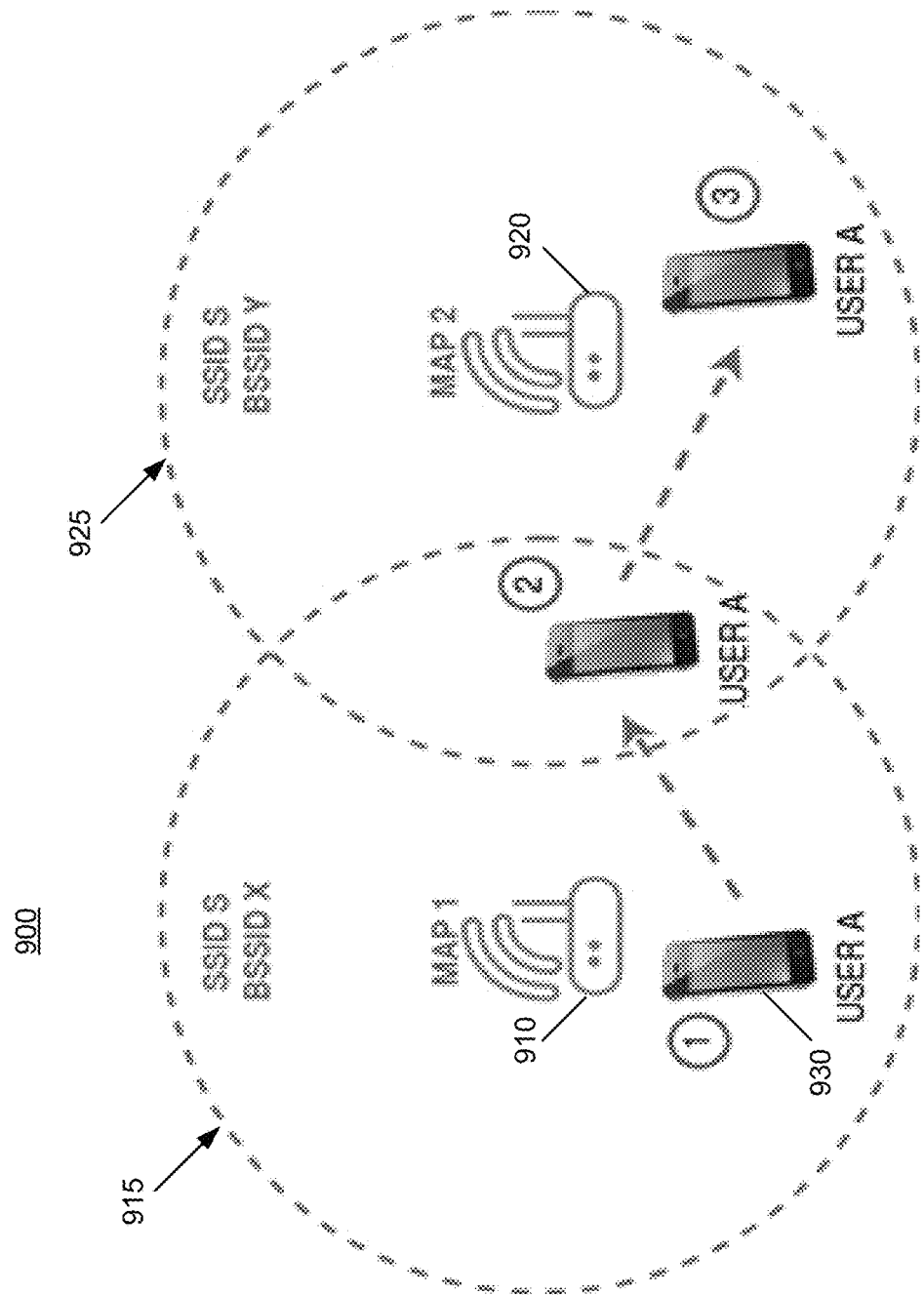
FIG. 9 illustrates a handover of an end-user device in a wireless network having mobile access points MAP 1 and MAP 2 that broadcast a single, shared SSID, but that use a separate BSSID to individually identify each of the MAP 1 and the MAP 2, in accordance with various aspects of the present disclosure.

FIG. 9 illustrates a handover of an end-user device 930 in a wireless network 900 having mobile access points MAP 1 910 and MAP 2 920 that broadcast a single, shared SSID, but that use a separate BSSID to individually identify each of the MAP 1 910 and the MAP 2 920, in accordance with various aspects of the present disclosure. It should be noted that while this example involves two MAPs, either or both of the APs may be a FAP. The example of FIG. 9 shows the MAP 1 910 providing wireless communication service (e.g., Wi-Fi (e.g., IEEE 802.11a/b/g/n/ac/ad)) over a first wireless coverage area 915 using an SSID S and a BSSID X, and a MAP 2 920 providing wireless communication service over a second wireless coverage area 925 using the shared SSID S and a BSSID Y that is different from BSSID X. As shown in FIG. 9, the end-user device 930 of User A is located within the wireless coverage area 915 (i.e., location (1)) and may therefore receive service from MAP 1 910. The end-user device 930 may detect the signals transmitted by the MAP 1 910 (e.g., in "beacon" frames or other transmissions), and may attempt to wirelessly connect to the MAP 1 910. The MAP 1 910 may then detect wireless signals transmitted by the end-user device 930 as part of the connection attempt.

In accordance with aspects of the present disclosure, the MAP 1 910 may, in response to the connection attempt by the end-user device 930, query a network controller (NC) (not shown) to which the MAP 1 910 is assigned, to request a valid IP address to assign for use by the end-user device 930. Additional details of an example network controller may be found, for example, in U.S. patent application Ser. No. 15/414,079 titled "Systems and Methods for Managing Mobility of Users in a Network of Moving Things at the Backhaul," filed on Jan. 24, 2017, the complete subject matter of which is hereby incorporated herein, in its entirety.

The MAP 1 910, upon receiving from the NC a response that includes the IP address assigned to the MAP 1 910, may inform the end-user device 930 of the IP address assigned to the end-user device 930, and the wireless connection of end-user device 930 with the MAP 1 910 may thereby be established. From that point forward, as long as the end-user device 930 determines that the wireless signal from the MAP 1 910 is of a sufficient quality (e.g., measured by a quality metric such as, for example, RSSI, SNR, bit/packet error rate, and/or the like) and is satisfactory, the end-user device 930 may remain wirelessly connected to the MAP 1 910. However, when the end-user device 930 determines that the quality of the wireless connection with the MAP 1 910 is no longer satisfactory (e.g., drops below a pre-determined threshold), the end-user device 930 may begin scanning for an alternative AP having acceptable signal quality. In the example of FIG. 9, the quality of the wireless connection between the end-user device 930 and the MAP 1 910 has deteriorated to a level that is unsatisfactory at the point where the end-user device 930 reaches location (2). If no alternative AP is found by the end-user device 930, the end-user device 930 may stay connected to the MAP 1 910 until the signal deteriorates further, the connection with the MAP 1 910 become unusable, and the connection drops.

If, however, an alternative AP (e.g., MAP or FAP) is found by the end-user device 930, the end-user device 930 may attempt to establish a wireless connection with the alternative AP. In the illustration of FIG. 9, the end-user device 930 may, for example, discover the wireless signal of the MAP 2 920 and, in response, may end its connection with the MAP 1 910 and attempt to establish a wireless connection with the MAP 2 920. In accordance with various aspects of the present disclosure, the MAP 2 920 may then query the NC to which MAP 2 920 is assigned (not shown), to request the assignment of an IP address for use by the end-user device 930. Further details of the operation of an NC may be found, for example, in U.S. patent application Ser. No. 15/414,079 titled "Systems and Methods for Managing Mobility of Users in a Network of Moving Things at the Backhaul," filed on Jan. 24, 2017, the complete subject matter of which is hereby incorporated herein, in its entirety. In accordance with various aspects of the present disclosure, the end-user device 930 may then receive an IP address from the MAP 2 920 and, in response, may establish the wireless connection with the MAP 2 920. In accordance with aspects of the present disclosure, the IP address provided by the NC of the MAP 2 920 to the MAP 2 920 may be the same IP address assigned by the NC serving MAP 1 910 that had been shared with the NC serving the MAP 2 920.

Following establishment of the wireless connection with the MAP 2 920, the end-user device 930 may then remain connected to the MAP 2 920 as it travels within the coverage area of MAP 2 920 to, for example, location 3. By permitting the end-user device 930 to control handover from MAP 1 910 to MAP 2 920 of FIG. 9, the control and management requirements upon the MAP 1 910 and the MAP 2 920 are reduced. However, the algorithms used for initiating the handover process by end-user devices such as the end-user device 930, as well as those for selecting the next AP (e.g., MAP or FAP), are not necessarily optimized from the perspective of providing seamless wireless connectivity and maximizing end-user quality of experience (QoE) to User A of end-user device 930. For example, the handover from MAP 1 910 to MAP 2 920 may be primarily controlled by algorithms of the end-user device 930. Thus, the handover may then vary from end-user device to end-user device, and an end-user device may only initiate a handover when its wireless connection to another element of the network of moving things is already too poor to maintain a required/desired level of quality, or the end-user device may select an AP having a different SSID that may not be a part of the serving network of moving things (e.g., if the end-user device detects such a network when near the edges of the network of moving things, or when in an area in which the signal(s) from other wireless networks are of better quality), which may lead to loss of mobility and session continuity for User A of end-user device 930.

Figure 10:
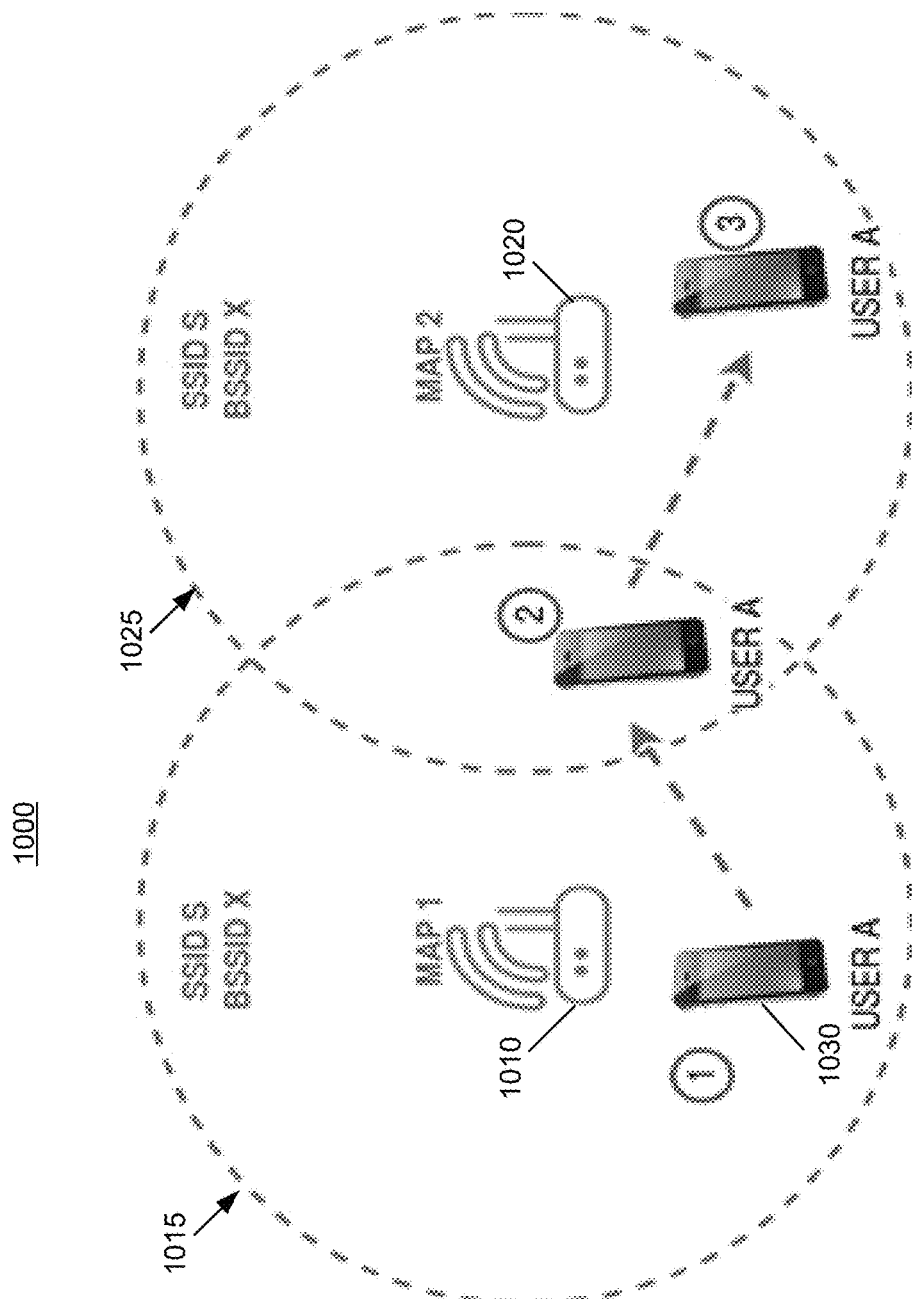
FIG. 10 illustrates a handover of an end-user device in a wireless network using a shared SSID, and a shared BSSID used to identify each of two mobile access points MAP 1 and MAP 2, in accordance with various aspects of the present disclosure.

FIG. 10 illustrates a handover of an end-user device 1030 in a wireless network 1000 using a shared SSID, and a shared BSSID used to identify each of two mobile access points MAP 1 1010 and MAP 2 1020, in accordance with various aspects of the present disclosure. In the example of FIG. 10, MAP 1 1010 and MAP 2 1020 may broadcast the same SSID and the same BSSID, and may be operating on the same RF channel/frequency band. The end-user device 1030 (at location 1), may detect signals transmitted by a Wi-Fi network interface of MAP 1 1010 (e.g., a "beacon" or other transmission broadcast in the coverage area 1015 illustrated by the dashed line), and may attempt to establish a wireless connection (e.g., may authenticate, associate, etc.) with the MAP 1 1010. In accordance with various aspects of the present disclosure, the MAP 1 1010 may detect signals sent by the end-user device 1030 in the attempt to establish the wireless connection and, in response, the MAP 1 1010 may query the NC to which the MAP 1 1010 is assigned (not shown), to request a valid IP address to assign to the end-user device 1030. Upon receiving a response containing the assigned IP address from its NC, the MAP 1 1010 may then inform the end-user device 1030 of the IP address assigned to the end-user device 1030, and the wireless connection may thereby be established between the MAP 1 1010 and the end-user device 1030.

As long as the wireless connection between the MAP 1 1010 and the end-user device 1030 remains of sufficient quality, the end-user device 1030 may remain in a wireless connection with the MAP 1 1010, and User A of end-user device 1030 has a satisfactory experience using the wireless communication provided by the MAP 1 1010. As the end-user device 1030 migrates toward location 2, however, an AP in accordance with aspects of the present disclosure (e.g., the MAP 1 1010) may determine that the quality of the wireless connection with the end-user device 1030 is deteriorating (e.g., that one or more quality metrics such as, for example, the RSSI, SNR, error rate(s), QoS, QoE, indicates a wireless connection quality below a certain level/threshold).

Figure 11:
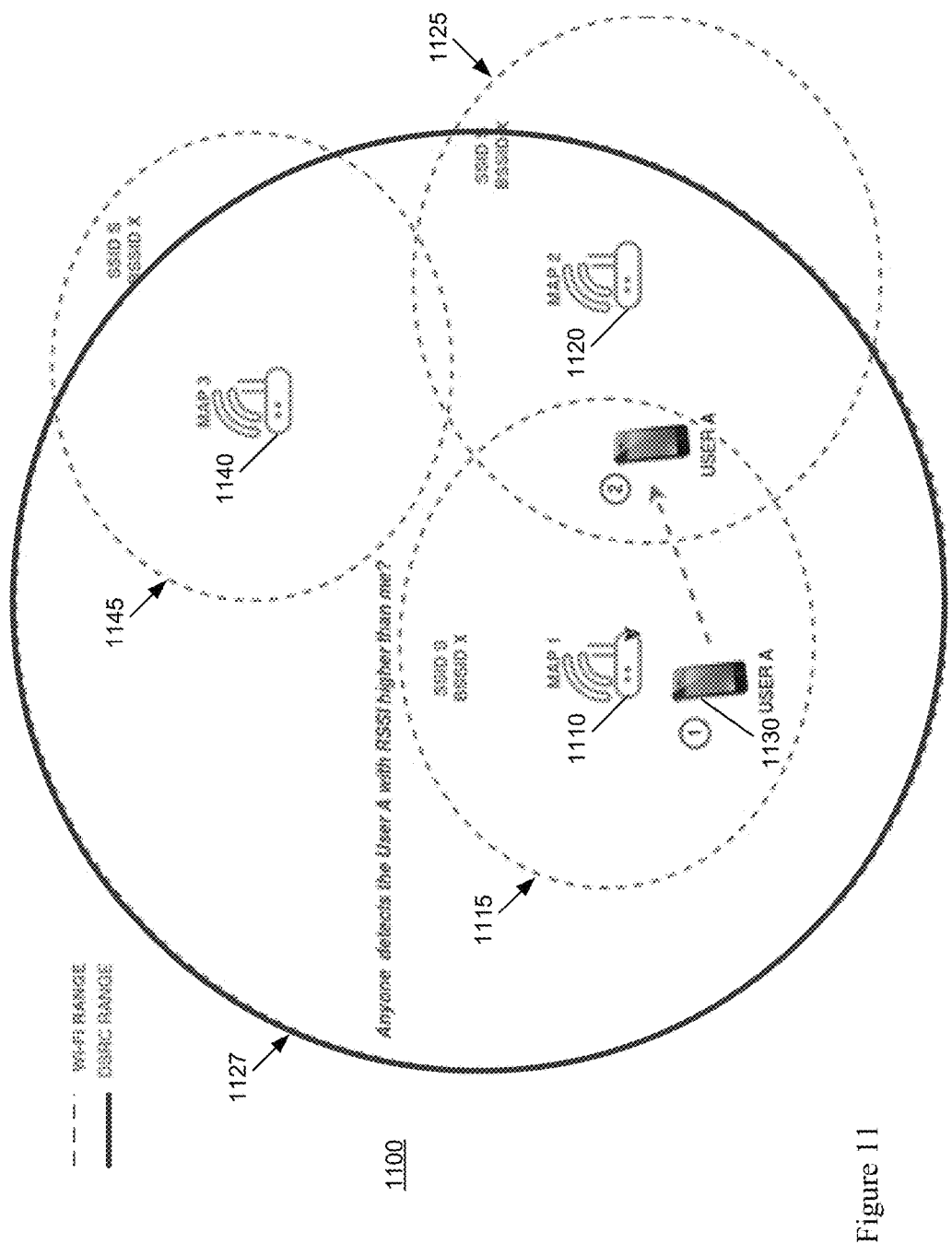
FIG. 11 illustrates a network in which a MAP 1 determines that a first wireless connection between the MAP 1 and an end-user device (e.g., a Wi-Fi link) has deteriorated to a level of quality that is unsatisfactory, in accordance with various aspects of the present disclosure.

FIG. 11 illustrates a network 1100 in which a MAP 1 1110 determines that a first wireless connection between the MAP 1 1110 and an end-user device 1130 (e.g., a Wi-Fi link) has deteriorated to a level of quality that is unsatisfactory, in accordance with various aspects of the present disclosure. The illustration of FIG. 11 shows an example coverage area of a first wireless network of the MAP 1 1110 used to serve the end-user device 1130 (the dashed line 1115), and the coverage areas (the dashed lines 1125, 1145) of the corresponding wireless networks (those broadcasting the same SSID and BSID in supported by MAP 2 1120 and MAP 3 1140, respectively, suitable for serving the end-user device 1130. The MAP 1 1110, MAP 2 1120, and the end-user device 1130 of FIG. 11 may, for example, correspond to the MAP 1 1010, MAP 2 1020, and the end-user device 1030 of FIG. 10, respectively. In response to determining that the quality of the wireless connection between MAP 1 1110 and the end-user device 1130 is less than satisfactory, the MAP 1 1110 may use a second wireless network (e.g., a Dedicated Short Range Communications (DSRC) network (e.g., IEEE 802.11p)) to communicate with the neighboring MAPs 1120, 1140 such as, for example, those APs within the wireless communication range (the solid line 1127), to determine whether any of the neighboring APs has information that identifies an AP that may be capable of wirelessly communicating with the end-user device 1130 and provide a better wireless connection for the end-user device 1130 that the MAP 1 1110. Such communication may, for example, comprise the MAP 1 1110 sending to neighboring APs (e.g., MAPs 1120, 1140), a broadcast message that contains the context of the end-user device 1130 (e.g., the MAC address and IP address of the end-user device 1130, and indicator(s) of wireless signal quality received by the MAP 1 1110 from the end-user device 1130 such as, for example, RSSI, signal-to-noise ratio, error rate(s), etc., for the wireless connection with the MAP 1 1110). The MAP 1 1110 may also include in the broadcast message, the context of the MAP 1 1110 (e.g., the current global navigation satellite service (GNSS)/GPS coordinates of the MAP 1 1110, the current velocity of the MAP 1 1110, etc.). The neighboring APs may then, in response, inform MAP 1 1110 accordingly, as shown in FIG. 11. Based on the reports from the neighboring APs, the MAP 1 1110 may select the neighboring AP that is reporting the received wireless signal having the best quality (e.g., highest indicated received signal strength (RSSI), SNR, lowest error rate, etc.) from end-user device 1130. In this situation, the MAP 1 1110 may inform the selected neighboring AP, MAP 2 1120, that it is to provide wireless service to the end-user device 1130.

Figure 12:
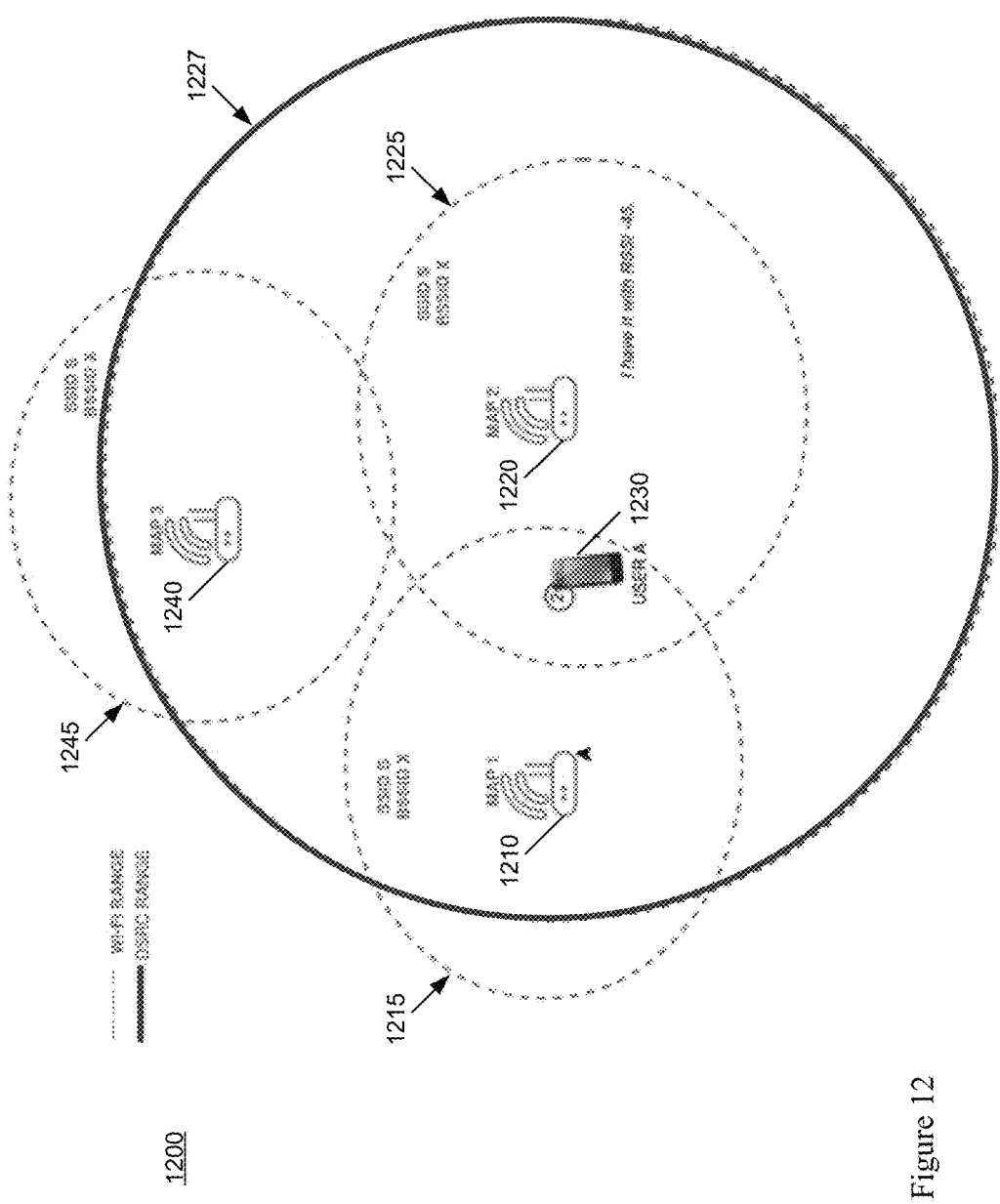
FIG. 12 is an illustration of an example network in which a MAP 1 has determined that a MAP 2, having a certain reported received signal quality for end-user device 1230 in wireless coverage area, is the most suitable AP to provide a wireless connection for the end-user device, in accordance with various aspects of the present disclosure.

FIG. 12 is an illustration of an example network 1200 in which a MAP 1 1210 has determined that a MAP 2 1220, having a certain reported received signal quality for end-user device 1230 in wireless coverage area 1225, is the most suitable AP to provide a wireless connection for the end-user device 1230, in accordance with various aspects of the present disclosure. The MAP 1 1210, MAP 2 1220, and end-user device 1230 may correspond to, for example, the MAP 1 1110, MAP 2 1120, and end-user device 1130 of FIG. 11. As discussed above with regard to FIG. 11, the MAP 1 1210 of FIG. 12 may have determined that MAP 2 1220 reported to MAP 1 1210 receiving a signal from the end-user device 1230. The received signal was determined by MAP 1 1210 to have the most suitable/best quality for serving the end-user device 1230 of signals from all responding AP neighbors of the MAP 1 1210 receiving the signal from end-user device 1230. As discussed above, in response to the determination by the MAP 1 1210 that MAP 2 1220 is the AP neighbor receiving the most suitable/best quality signal from the end-user device 1230 of all AP neighbors of MAP 1 1210, the MAP 1 1210 may inform the MAP 2 1220 that MAP 2 1220 is assigned to provide wireless service to the end-user device 1230, and the MAP 1 1210 may then cease providing wireless service to the end-user device 1230.

Figure 13:
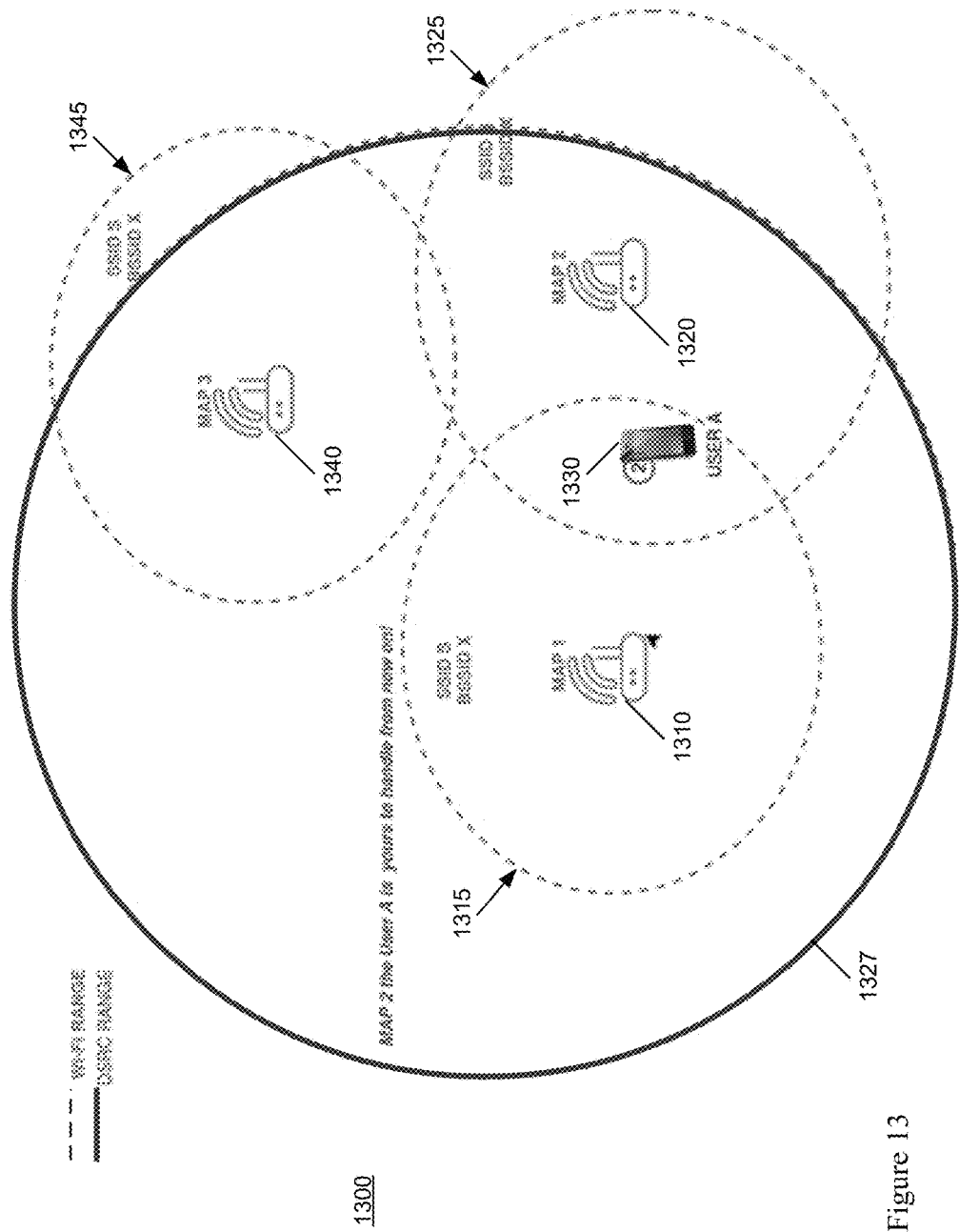
FIG. 13 is an illustration of an example network in which a MAP 1 has determined that a MAP 2, having a certain reported received signal quality for end-user device in wireless coverage area, is the most suitable AP to provide a wireless connection for the end-user device, in accordance with various aspects of the present disclosure.

FIG. 13 is an illustration of an example network 1300 in which a MAP 1 1310 has determined that a MAP 2 1320, having a certain reported received signal quality for end-user device 1330 in wireless coverage area 1325, is the most suitable AP to provide a wireless connection for the end-user device 1330, in accordance with various aspects of the present disclosure. In response to such a determination, the MAP 1 1310 may send to the MAP 2 1320, via a separate/second RF wireless network such as, for example, a DSRC network supported by the APs of FIG. 13, MAP 1 1310, MAP 2 1320, MAP 3 1340, information identifying the end-user device 1330 to the newly selected serving AP MAP 2 1320. Such information may include, for example, a MAC address, an IP address, and/or other addressing/identifying information of the end-user device 1330. The MAP 2 1320 may then acknowledge the new assignment of end-user device 1330 to MAP 2 1320, and may inform the NC to which MAP 2 1320 is assigned that MAP 2 1320 now "owns" end-user device 1330. The MAP 2 1320 may again measure one or more quality indicators for the signals received from the end-user device 1330, to confirm that the MAP 2 1320 is more suitable than MAP 1 1310 for handling wireless communication for the end-user device 1330, and then MAP 2 1320 may send a message to the MAP 1 1310, signaling that the MAP 2 1320 is now serving the end-user device 1330. Finally, the MAP 1 1310 may advertise/broadcast to neighboring APs that received the initial broadcast message by MAP 1 1310 (e.g., MAP 3 1340) that end-user device 1330 has disconnected from MAP 1 1310 and is now connected to and served by MAP 2 1320.

In accordance with aspects of the present disclosure, once the neighboring APs have received the broadcast from MAP 1 1310 informing them that the end-user device 1330 is now being served by MAP 2 1320, only MAP 2 1320 will forward traffic for end-user device 1330. The other APs (e.g., MAP 1 1310 and MAP 3 1340 of FIG. 13) that receive traffic for end-user device 1330 will drop it. An advantage of this shared SSID and shared BSSID implementation is that a network of moving things in accordance with the present disclosure is able to fully control when an end-user device (e.g., end-user device 1330) performs a handover. The network is able to sense at all times which AP is best suited to provide service to any given end-user device and keep that end-user device always connected with the best quality service available. In accordance with some aspects of the present disclosure, when all of the APs are broadcasting the same SSID using the same BSSID on the same channel, all in-range APs may receive the traffic transmitted by a given end-user device, even though such traffic is only forwarded by one of the in-range APs. For example, in the illustrative arrangement of FIG. 13, MAP 1 1310 is still seeing the traffic generated by end-user device 1330, even though MAP 2 1320 is receiving and forwarding such traffic towards the destination in the network or a connected network (e.g., the Internet). In accordance with aspects of the present disclosure, Map 1 1310 does, however, drop any traffic received from the end-user device 1310.

Figure 14:
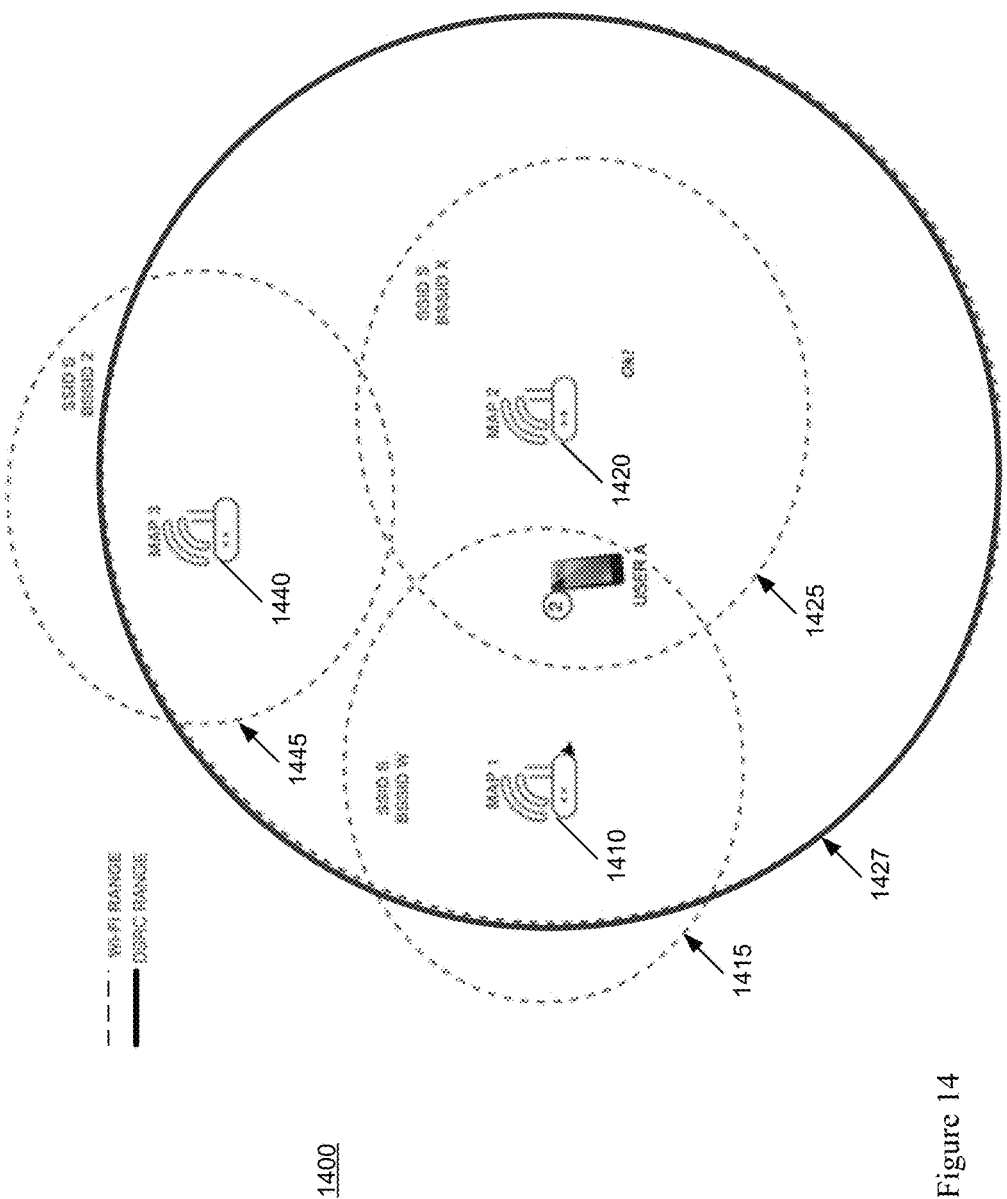
FIG. 14 is an illustration of an example network having three access points MAP 1, MAP 2, and MAP 3 that employ a shared SSID and a per-end-user-device BSSID, in accordance with various aspects of the present disclosure.

FIG. 14 is an illustration of an example network 1400 having three access points MAP 1 1410, MAP 2 1420, and MAP 3 1440 that employ a shared SSID and a per-end-user device BSSID, in accordance with various aspects of the present disclosure. A shared SSID and per-end-user-device BSSID implementation is similar in some ways to the shared SSID and shared BSSID implementation of FIG. 10 through FIG. 13. However, in the arrangement of FIG. 14, the BSSID used by an AP (e.g., MAP 1 1410, MAP 2 1420, MAP 3 1440) in wirelessly communicating with an end-user device such as, for example, the end-user device 1430) is different for each end-user device served by the network. In accordance with aspects of the present disclosure, each end-user device is assigned its own BSSID that is only active on the AP that currently "owns" the end-user device. This mechanism is managed among the APs. In accordance with various aspects of the present disclosure, the use of the circuitry of a single wireless network interface for the support of multiple wireless networks, where each network uses its own BSSID, may be achieved by, for example, virtualizing the wireless network interface in the operating system code and/or software/firmware that controls the wireless network interface circuitry.

For example, the APs of FIG. 14 (MAP 1 1410, MAP 2 1420, MAP 3 1440) support a set of wireless networks (e.g., one or more Wi-Fi (IEEE 802.11a/b/g/n/ac/ad) networks) in which each wireless network interface broadcasts the same SSID, but uses a different BSSID for each end-user device being served. In accordance with aspects of the present disclosure, an end-user device (e.g., end-user device 1430) of User A may attempt to establish a connection (e.g., may authenticate, associate, etc.) with one of the wireless networks that the end-user device has detected (e.g., the MAP 1 1410 transmitting SSID S and BSSID W). Such an establishment may, in general, progress in a manner similar to that described in regard to FIGS. 9-13, above. In regard to the arrangement of FIG. 14, however, at some point after the end-user device 1430 establishes a wireless connection with the MAP 1 1410 and the end-user device 1430 is receiving service from the MAP 1 1410, the MAP 1 1410 may determine that the quality of the wireless connection with the end-user device 1430 has deteriorated so that the quality of the wireless signal/service received by the end-user device 1430 is no longer satisfactory. In response, the MAP 1 1410 may decide that the end-user device 1430 should be moved to another AP, and in response to that decision, the MAP 1 1410 may broadcast information to neighboring APs over, for example, a second wireless network (e.g., to MAP 2 1420 and MAP 3 1440 using a DSRC network having a coverage area 1428) in a manner similar to that used in the process described above in regard to FIG. 11. However, in the situation now discussed, the broadcast over the second wireless network may also indicate the BSSID currently being employed by MAP 1 1410 in providing wireless service to the end-user device 1430.

Figure 15:
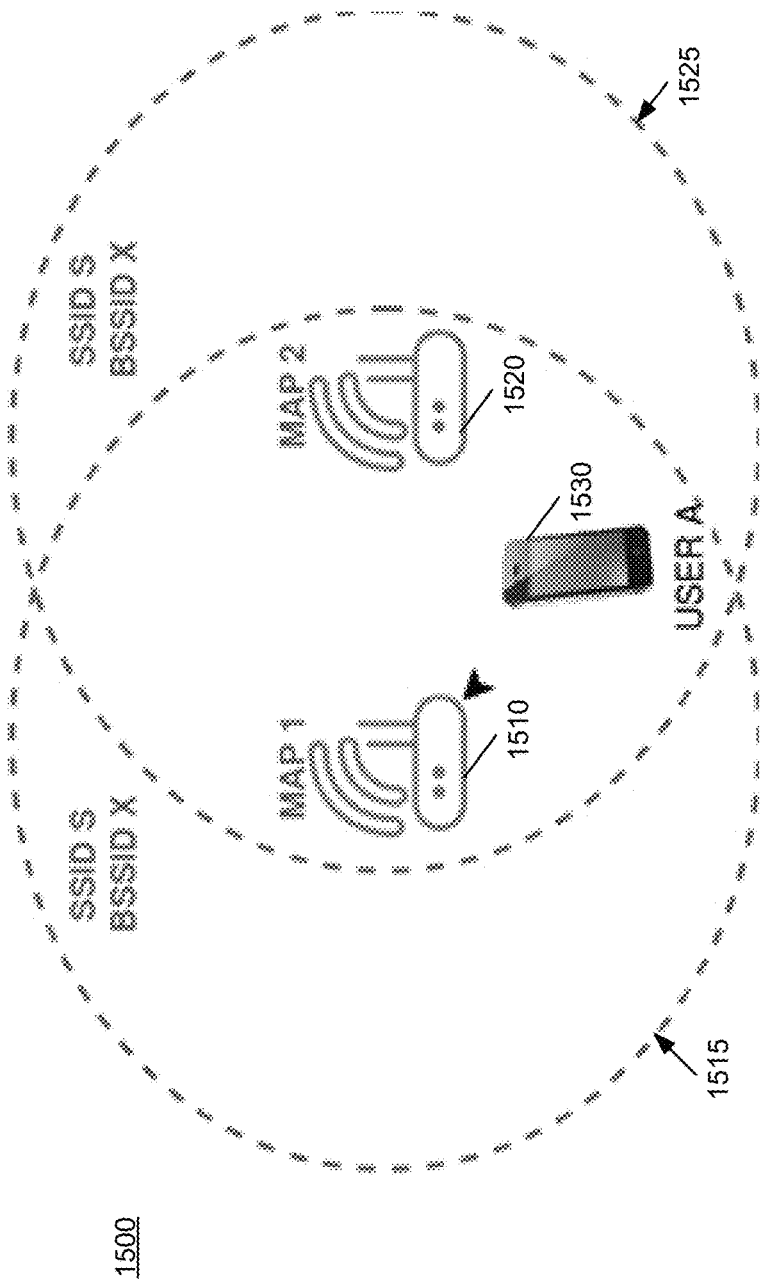
FIG. 15 is an illustration of an end-user device located within the respective coverage areas of two access points MAP1 and MAP 2, in accordance with various aspects of the present disclosure.

In order to evaluate the quality of the wireless signal of the end-user device 1430, neighboring APs that received the broadcast from the MAP 1 1410 via the second wireless network may temporarily establish a wireless network (e.g., a Wi-Fi network) using the BSSID broadcast to the neighboring APs by the MAP 1 1410 (that is currently serving the end-user device 1430). In accordance with various aspects of the present disclosure, only those APs (e.g., FAPs and/or MAPs) located with a certain range of distance (e.g., the range of distance may be dynamically determined based on the speed of the end-user device 1430 and/or the APs (e.g., where one or more of the neighboring APs are mobile APs (MAPs)) may process the information. In accordance with aspects of the present disclosure, each AP may know its current geographic location, and may share such location information with neighboring APs and/or the Cloud, so that APs may determine their own locations and those of neighboring APs. Those APs within the certain range of distance may each establish, for a certain brief period of time (e.g., on the order of milliseconds, tens of milliseconds, or hundreds of milliseconds), a temporary wireless network using the BSSID currently employed by the MAP 1 1410 in serving the end-user device 1430. During this certain brief period of time, the neighboring APs within the certain range of distance may measure the quality of the signal (e.g., the RSSI, SNR, error rate, etc.) received from the end-user device 1430. FIG. 15 illustrates an example scenario in accordance with the present disclosure, in which traffic destined for the end-user device 1530 via serving MAP 1 1510 with coverage area 1515 may be blocked (e.g., changes to IP tables at the MAP 1 1510 may be temporarily modified), while the temporary network is enabled at the neighboring MAP 2 1520 having coverage area 1525.

In accordance with aspects of the present disclosure, a neighboring AP (e.g., the MAP 2 1420 or MAP 3 1440 of FIG. 14) may determine that it has at least a pre-determined level or threshold of quality (e.g., RSSI, SNR, error rate, etc.) for the signal received from the end-user device 1430. In response, the neighboring AP may then notify the MAP 1 1410 of the quality of the signal from the end-user device 1430 by replying to the broadcast of the MAP 1 1410 (e.g., via the second wireless network (e.g., DSRC)). In accordance with various aspects of the present disclosure, each neighboring AP may apply one or more signal quality thresholds to determine whether certain received signal quality conditions for the end-user device are present at the neighboring AP, before a reply to the broadcast on the second wireless network may be sent by the neighboring AP to the AP currently serving the end-user device. For example, in the context of FIG. 14, the sending of a reply by the neighboring APs (e.g., MAP 2 1420, MAP 3 1440) to the broadcast of the serving AP (e.g., MAP 1 1410) may depend on the current quality of the signal received from the end-user device 1430 by serving MAP 1 1410 (e.g., RSSI, SNR, error rate, etc.) and/or other considerations.

For example, based on the arrangement of FIG. 14, the MAP 1 1410 may currently measure a received signal strength of −70 dB from the end-user device 1430. That signal quality measurement may accompany the broadcast sent by the MAP 1 1410 to the neighboring APs within the certain range of distance (e.g., the MAP 2 1420 and MAP 3 1440). In accordance with aspects of the present disclosure, by using that current measurement of quality of the signal received by MAP 1 1410 from the end-user device 1430 shared in the broadcast on the second wireless network, each of the receiving neighbor APs (e.g., the MAP 2 1420 and MAP 3 1440) may, for example, reply only if the receiving neighbor AP measures −60 dB or better, when the measurement of quality of the signal from the end-user device 1430 is greater than −85 dB. However, the neighboring APs may, for example, always reply when MAP 1 1410 is currently measuring a quality of the signal received from the end-user device 1430 of −85 dB or below (which may be very close to a signal quality at which failure of the wireless connection between the end-user device 1430 and the serving MAP 1 1410 will occur), because any expected improvement in signal quality (e.g., RSSI, SNR, error rate, etc.) gained through service by a different AP may warrant a reply and a potential move of the end-user device 1430 to a new serving AP (e.g., MAP 2 1420 or MAP 3 1440).

In accordance with various aspects of the present disclosure, after the MAP 1 1410 receives one or more replies from the neighboring APs (e.g., MAP 2 1420 and/or MAP 3 1440), the MAP 1 1410 may then select from the responding APs, the AP that is receiving a signal from the MAP 1 1410 having the best quality. The MAP 1 1410 may then inform the selected neighboring AP (e.g., MAP 2 1420), and the selected AP (e.g., MAP 2 1420) may then establish a wireless network using the BSSID sent in the broadcast over the second wireless network, which is the same BSSID as that of the wireless network currently serving the end-user device 1430 on the MAP 1 1410. Once the wireless network is established on the selected AP (e.g., in this example, MAP 2 1420), the MAP 1 1410 drops its wireless network that uses that BSSID. At that point, only the selected AP (i.e., MAP 2 1420) will be supporting a wireless network using the same BSSID used by MAP 1 1410 to provide wireless service to the end-user device 1430, and therefore only the selected AP (i.e., MAP 2 1420) receives traffic for the end-user device 1430.

As demonstrated above, an advantage of the shared SSID and per-end-user-device BSSID approach of the present disclosure is that interference between end-user user devices and/or APs (e.g., MAPs and/or FAPs) may be reduced, when compared to interference that may occur when using wireless networks employing a shared SSID and a shared BSSID. On the other hand, the shared SSID and per-user-device BSSID approach requires not only managing the user device "owner," but also the several Wi-Fi networks since, ideally, each MAP will have as many Wi-Fi networks as user devices connected to it.

FIG. 15 is an illustration of an end-user device 1530 located within the respective coverage areas 1515, 1525 of two access points MAP1 1510 and MAP 2 1520, in accordance with various aspects of the present disclosure. In the illustration of FIG. 15, the access point MAP 1 1510 is currently handling the communication of end-user data with the end-user device 1530 of User A. The example of FIG. 15 illustrates a scenario in which traffic destined for the end-user device 1530 via serving MAP 1 1510 with coverage area 1515 may be temporarily blocked (e.g., changes to IP tables at the MAP 1 1510 may be temporarily modified), while a temporary network is enabled at the neighboring MAP 2 1520 having coverage area 1525. The MAP 1 1510 may communicate with neighboring access points (e.g., MAP 2 1520) to determine which, if any, are able to communicate satisfactorily with the end-user device 1530, and may request that the MAP 2 1520 take over communication with the end-user device 1530. It should be noted that, in accordance with various aspects of the present disclosure, only one of MAP 1 1510 and MAP 2 1520 communicate end-user data with the end-user device 1530 at any point in time.

Figure 16A:
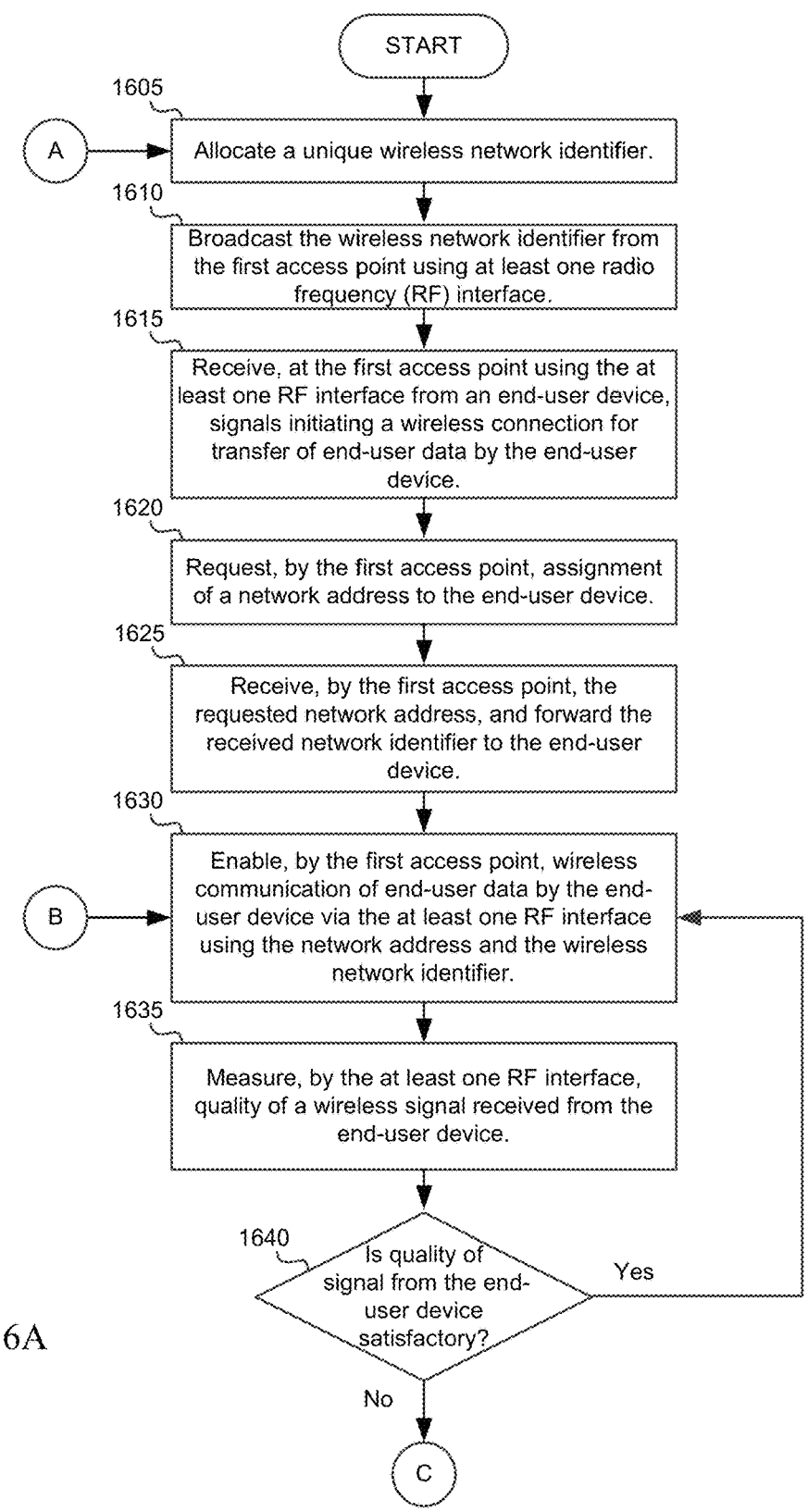
FIGS. 16A-16B illustrate an example method of operating an access point, in accordance with various aspects of the present disclosure.
Figure 16B:
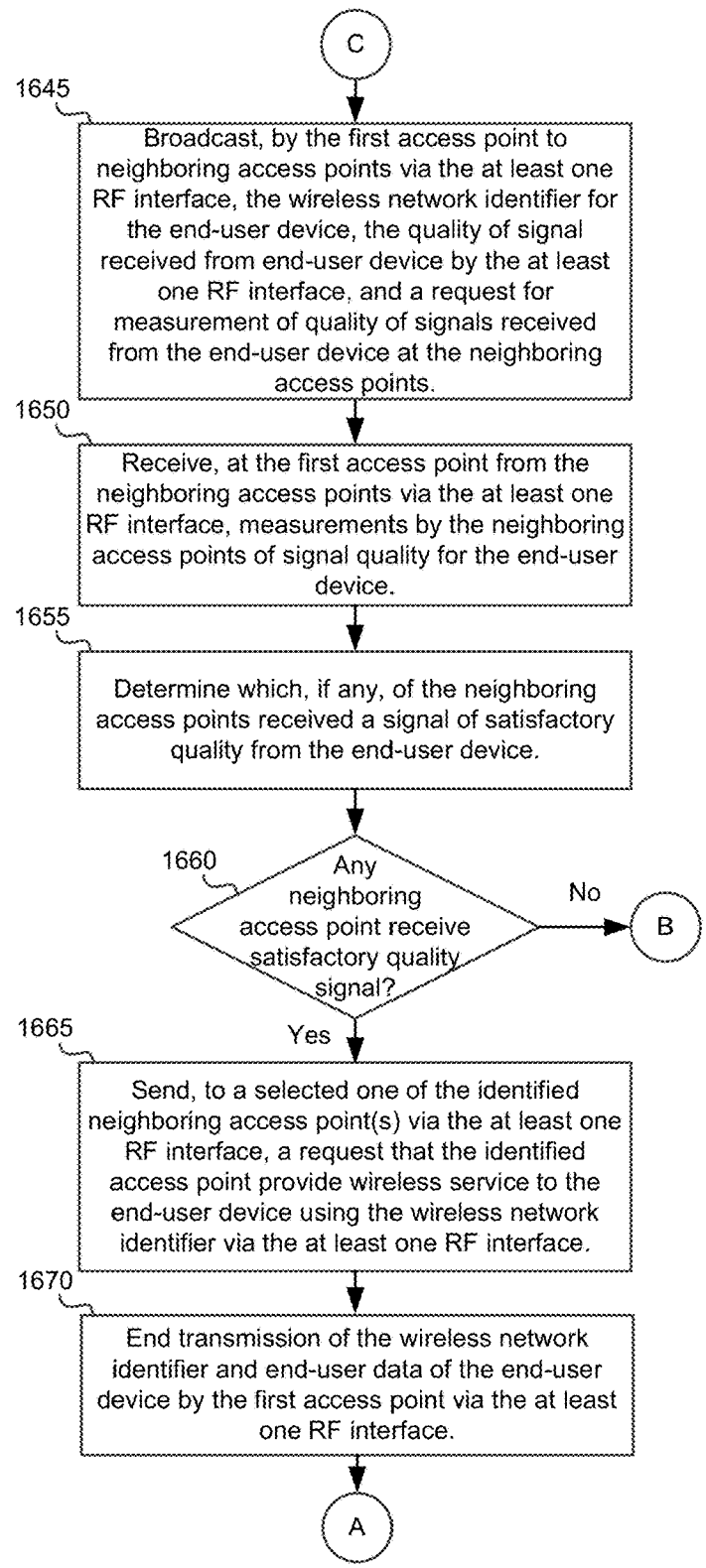

FIGS. 16A-16B illustrate an example method of operating an access point, in accordance with various aspects of the present disclosure. The steps of the method of FIGS. 16A-16B may be performed by an AP such as, for example, any of the APs illustrated in or discussed in reference to the networks and systems of FIGS. 1-15.

The method of FIGS. 16A-16B begins at block 1605 of FIG. 16A. At block 1605, a first access point of a network in accordance with the present disclosure (e.g., FAP or MAP) may allocate a unique wireless network identifier for use with a wireless coverage area or region supporting wireless communication with end-user devices such as those described herein. The first access point may be, for example, a mobile access point such as the mobile AP 840 of FIG. 8. Then, at block 1610, the first access point may broadcast the wireless network identifier using at least one radio frequency (RF) interface. Such an RF interface may comprise two or more RF interfaces that may each support one or more RF channels and corresponding communication protocols including, for example, the radio spectrum and communication protocols used for Wi-Fi and DSRC communication methodologies. Next, at block 1615, the first access point may receive, from an end-user device, signals initiating a wireless connection for transfer of end-user data by the end-user device using the at least one RF interface of the first access point. Then, at block 1620, the first access point may request assignment of a network address to the end-user device. Such a network address may, for example, be an Internet Protocol (IP) address, and may be allocated to the end-user device by a network node such as, for example, the network controller 710 of FIG. 7. Such a network controller may also be responsible for routing end-user data for the end-user devices served by the first access point.

Next, at block 1625, the first access point may receive the requested network address, and may forward the received network identifier to the end-user device. Then, at block 1630, the first access point may enable wireless communication of end-user data by the end user device via the at least one RF interface using the network address and the wireless network identifier. At block 1635, during a communication session with the end-user device, the first access point may measure, by the at least one RF interface, quality of a wireless signal received from the end-user device, and at block 1640, the first access device may determine whether a quality of signal from the end-user device is satisfactory. Such a determination may be based upon one or more quality thresholds regarding signal qualities such as, for example, a received signal strength indicator (RSSI), a signal-to-noise ratio (SNR), an error rate, or other suitable metric. If, at block 1640, it is determined that the quality of the signal received from the end-user device is satisfactory, the first access point may continue the communication session at block 1630, discussed above. If, however, it is determined, at block 1640, that the quality of the signal received from the end-user device is not satisfactory, the first access point may pass control to block 1645.

At block 1645, the first access point may, for example, broadcast to neighboring access points via the at least one RF interface, the wireless network identifier for the end-user device, the quality of signal received from end-user device by the at least one RF interface, and a request for measurement of quality of signals received from the end-user device at the neighboring access points. The broadcast of such a request may, for example, be transmitted using a portion of RF spectrum and a communication protocol different from the RF spectrum and communication protocol used for communication between the first access point and any served end-user devices. Then, at block 1650, the first access point may receive, from the neighboring access points via the at least one RF interface, measurements by the neighboring access points of signal quality for the end-user device. Next, at block 1655, the first access point may determine the identity of those neighboring access points that have received a signal of satisfactory quality from the end-user device. In accordance with aspects of the present disclosure, each of the neighboring access points may perform an evaluation of quality of signals that the neighboring access point received from the end-user device, and may respond to the broadcast request (of block 1645), based on that evaluation. At block 1660, the first access point may, based on responses from the neighboring access points, determine whether any of the neighboring access points have received signals of satisfactory quality from the end-user device. If no neighboring access points have received signals of satisfactory quality from the end-user device, then control may then pass to block 1630, discussed above. If, however, one or more neighboring access points received signals of satisfactory quality from the end-user device, then control may continue at block 1665.

At block 1665, the first access point may send, to a selected one of the identified neighboring access point(s) via the at least one RF interface, a request that the selected access point provide wireless service to the end-user device using the wireless network identifier via the at least one RF interface. Then, at block 1670, the first access point may end transmission of the wireless network identifier and end-user data of the end-user device by the first access point via the at least one RF interface. It should be noted that the network controller previously responsible for routing end-user data of the end-user device while served by the first access point may route such end-user data through a network controller to which the newly selected access point (of the neighboring access points) is assigned, if it is different than the current serving network controller, to enable the selected access point to maintain communication of end-user data for the end-user device. In accordance with the example of FIGS. 16A-16B, control of the first access point may then pass to block 1605, discussed above.

Various aspects of the present disclosure may be seen in a method of operating a plurality of access points of a network of moving things. Each access point of the plurality of access points may comprise at least one radio frequency (RF) interface enabling wireless mobile communication by a plurality of end-user devices with one another and with remote resources accessible to the network of moving things. Such a method may be performed at a first access point of the plurality of access points. The method may comprise assigning a network identifier representing a region of wireless network access supported by the first access point for communication with the plurality of end-user devices, and broadcasting the network identifier using the at least one RF interface of the first access point. The method may also comprise receiving, from a first end-user device of the plurality of end-user devices using the at least one RF interface, a signal representing a request by the first end-user device to establish a wireless connection configured for communication of first end-user data via the first access point. The method may request allocation of a network address to the first end-user device to enable communication of the first end-user data via the plurality of access points and through the network of moving things, and may wirelessly communicate the first end-user data of the first end-user device via the first access point, using the network identifier and the network address. The method may also determine, by the first access point, whether a quality of wireless communication between the at least one RF interface and the first end-user device is above a certain quality threshold.

In accordance with aspects of the present disclosure, if the quality of wireless communication between the at least one RF interface and the first end-user device is above the certain quality threshold, the method may continue wirelessly communicating the first end-user data of the first end-user device via the first access point, using the network identifier and the network address, and determining, by the first access point, whether the quality of wireless communication between the at last one RF interface and the first end-user device is above a certain threshold. If the quality of wireless communication between the at least one RF interface and the first end-user device is not above the certain quality threshold, the method may perform selecting one particular access point of the one or more neighboring access points; transmitting, to the particular access point, a notification requesting the particular access point to begin communication of the first end-user data with the first end-user device; and ending, by the first access point, communication of the first end-user data with the first end-user device.

In accordance with aspects of the present disclosure, the plurality of access points may comprise access points that are at a fixed geographic location known to the respective access point, and access points installed in vehicles that are mobile and at a current geographic location known to the respective access point. The assigned network identifier may be the same for all access points in the network of moving things, and the assigned network identifier may be unique to each end-user device being served by the network of moving things. The network identifier may comprise a Basic Service Set Identifier (BSSID) of an IEEE 802.11b, IEEE 802.11g, IEEE 802.11n, or IEEE 802.11ac protocol. The network identifier may be transferred to the particular access point when the notification requesting the particular access point to begin communication of the first end-user data with the first end-user device is sent. The network address may be an Internet Protocol (IP) address that is assigned to the end-user device by a node of the network of moving things that routes end-user data for a particular end-user device according to the IP address assigned to the particular end-user devices by the node.

In a method in accordance with various aspects of the present disclosure, selecting one particular access point of the one or more neighboring access points may comprise sending, to the one or more neighboring access points of the plurality of access points via the at least one RF interface, a request to provide to the first access point, a respective measurement of quality of wireless communication of the first end-user device made at the one or more neighboring access points. The method may also comprise receiving, from the one or more neighboring access points at the first access point, the measurements of quality of wireless communication of the first end-user device; and selecting the one particular access point of the one or more neighboring access points, based on the received measurements of quality of wireless communication of the first end-user device. The one or more neighboring access points may be selected from the plurality of access point based on the geographic location of the first access point. Each access point of the plurality of access points wirelessly may share its geographic location with the remaining access points of the plurality of access points. Wireless communication between the plurality of access points and the plurality of end-user devices may use a first radio frequency channel and a first communication protocol, and wireless communication between the first access point and the one or more neighboring access points may use a second radio frequency channel and a second communication protocol.

Additional aspects of the present disclosure may be observed in a non-transitory computer-readable medium having stored thereon a plurality of code sections. Each code section may comprise a plurality of instructions executable by one or more processors. The executable instructions may cause the one or more processors to perform a method of operating a first access point of a plurality of access points of a network of moving things, where each access point of the plurality of access points may comprise at least one radio frequency (RF) interface enabling wireless mobile communication by a plurality of end-user devices with one another and with remote resources accessible to the network of moving things. The steps of such a method may be as described above.

Further aspects of the present disclosure may be found in a system for an access point of a network of moving things comprising a plurality of access points. The system may comprise one or more processors operably coupled to at least one radio frequency (RF) interface enabling wireless mobile communication by a plurality of end-user devices with one another and with remote resources accessible to the network of moving things. The one or more processors may be operable to, at least, perform the steps of a method such as the method described above.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of operating a plurality of access points of a network of moving things, each access point of the plurality of access points comprising at least one radio frequency (RF) interface enabling wireless mobile communication by a plurality of end-user devices with one another and with remote resources accessible to the network of moving things, the method comprising:
at a first access point of the plurality of access points,
broadcasting a network identifier using the at least one RF interface of the first access point, the network identifier representing a region of wireless network access supported by the first access point for communication with the plurality of end-user devices, the first access point being at a geographic location having satellite-based coordinates known to the first access point;
establishing a wireless connection configured for communication of first end-user data by a first end-user device of the plurality of end-user devices, via the at least one RF interface of the first access point;
determining, by the first access point, whether a quality of wireless communication between the at least one RF interface and the first end-user device is below a certain quality threshold; and
if the quality of wireless communication between the at least one RF interface and the first end-user device is determined to be below the certain quality threshold,
causing evaluation, by a set of access points of the plurality of access points that are within a certain distance range of the first access point, of a quality of wireless communication of the end-user device with each access point of the set of access points, by wirelessly broadcasting information comprising the satellite-based coordinates of the first access point to the plurality of access points,
processing responses received from respective access points of the set of access points in response to the broadcast information, each received response comprising a measurement of a quality of a signal received by the respective access point from the end-user device,
selecting one particular access point from the set of access points, based upon received responses to the broadcast information,
transmitting, to the particular access point, a notification requesting the particular access point to begin communication of the first end-user data with the first end-user device, and
ending, by the first access point, communication of the first end-user data with the first end-user device.

2. The method according to claim 1, wherein the plurality of access points comprises access points that are each at a respective fixed geographic location having satellite-based coordinates known to the respective access point, and access points installed in vehicles that are mobile and at a respective current geographic location having satellite-based coordinates known to the respective access point.

3. The method according to claim 1, wherein the network identifier is the same for all access points in the network of moving things.

4. The method according to claim 1, wherein the network identifier is unique to each end-user device being served by the network of moving things.

5. The method according to claim 1, wherein the network identifier comprises a Basic Service Set Identifier (BSSID) of an IEEE 802.11b, IEEE 802.11g, IEEE 802.11n, or IEEE 802.11ac protocol.

6. The method according to claim 1, wherein the network identifier is transferred to the particular access point when the broadcast of information is sent to the particular access point by the first access point.

7. The method according to claim 1, wherein a network address that comprises an Internet Protocol (IP) address is assigned to the end-user device by a node of the network of moving things that routes end-user data for a particular end-user device according to the IP address assigned to the particular end-user devices by the node.

8. The method according to claim 1, wherein each access point of the plurality of access points wirelessly shares satellite-based coordinates of a current geographic location of the access point with the remaining access points of the plurality of access points.

9. The method according to claim 1, wherein wireless communication between the plurality of access points and the plurality of end-user devices uses a first radio frequency channel and a first communication protocol, and wireless communication between the first access point and the set of access points uses a second radio frequency channel and a second communication protocol.

10. A non-transitory computer-readable medium having stored thereon a plurality of code sections, where each code section comprises a plurality of instructions executable by one or more processors to cause the one or more processors to perform a method of operating a first access point of a plurality of access points of a network of moving things, each access point of the plurality of access points comprising at least one radio frequency (RF) interface enabling wireless mobile communication by a plurality of end-user devices with one another and with remote resources accessible to the network of moving things, the steps of the method comprising:
- broadcasting a network identifier using the at least one RF interface of the first access point, the network identifier representing a region of wireless network access supported by the first access point for communication with the plurality of end-user devices, the first access point being at a geographic location having satellite-based coordinates known to the first access point;
- establishing a wireless connection configured for communication of first end-user data by a first end-user device of the plurality of end-user devices, via the at least one RF interface of the first access point;
- determining, by the first access point, whether a quality of wireless communication between the at least one RF interface and the first end-user device is below a certain quality threshold; and
- if the quality of wireless communication between the at least one RF interface and the first end-user device is determined to be below the certain quality threshold
  - causing evaluation, by a set of access points of the plurality of access points that are within a certain distance range of the first access point, of a quality of wireless communication of the end-user device with each access point of the set of access points, by wirelessly broadcasting information comprising the satellite-based coordinates of the first access point to the plurality of access points,
  - processing responses received from respective access points of the set of access points in response to the broadcast information, each received response comprising a measurement of a quality of a signal received by the respective access point from the end-user device,
  - selecting one particular access point from the set of access points, based upon received responses to the broadcast information,
  - transmitting, to the particular access point, a notification requesting the particular access point to begin communication of the first end-user data with the first end-user device, and
  - ending, by the first access point, communication of the first end-user data with the first end-user device.

11. The non-transitory computer-readable medium according to claim 10, wherein the plurality of access points comprises access points that are each at a respective fixed geographic location having satellite-based coordinates known to the respective access point, and access points installed in vehicles that are mobile and at a respective current geographic location having satellite-based coordinates known to the respective access point.

12. The non-transitory computer-readable medium according to claim 10, wherein the network identifier is the same for all access points in the network of moving things.

13. The non-transitory computer-readable medium according to claim 10, wherein the network identifier is unique to each end-user device being served by the network of moving things.

14. The non-transitory computer-readable medium according to claim 10, wherein the network identifier comprises a Basic Service Set Identifier (BSSID) of an IEEE 802.11b, IEEE 802.11g, IEEE 802.11n, or IEEE 802.11ac protocol.

15. The non-transitory computer-readable medium according to claim 10, wherein the network identifier is transferred to the particular access point when the broadcast of information is sent to the particular access point by the first access point.

16. The non-transitory computer-readable medium according to claim 10, wherein a network address that comprises an Internet Protocol (IP) address is assigned to the end-user device by a node of the network of moving things that routes end-user data for a particular end-user device according to the IP address assigned to the particular end-user devices by the node.

17. The non-transitory computer-readable medium according to claim 10, wherein each access point of the plurality of access points wirelessly shares satellite-based coordinates of a current geographic location of the access point with the remaining access points of the plurality of access points.

18. The non-transitory computer-readable medium according to claim 10, wherein wireless communication between the plurality of access points and the plurality of end-user devices uses a first radio frequency channel and a first communication protocol, and wireless communication between the first access point and the set of access points uses a second radio frequency channel and a second communication protocol.

19. A system for an access point of a network of moving things comprising a plurality of access points, the system comprising:
- in a first access point of the plurality of access points, one or more processors operably coupled to at least one radio frequency (RF) interface enabling wireless mobile communication by a plurality of end-user devices with one another and with remote resources accessible to the network of moving things, the one or more processors operable to, at least:
  - broadcast a network identifier using the at least one RF interface of the first access point, the network identifier representing a region of wireless network access supported by the first access point for communication with the plurality of end-user devices, the first access point being at a geographic location having satellite-based coordinates known to the first access point;
  - establish a wireless connection configured for communication of first end-user data by a first end-user device of the plurality of end-user devices, via the at least one RF interface of the first access point;
  - determine, by the first access point, whether a quality of wireless communication between the at least one RF interface and the first end-user device is below a certain quality threshold; and
  - if the quality of wireless communication between the at least one RF interface and the first end-user device is determined to be below the certain quality threshold,
    - cause evaluation, by a set of access points of the plurality of access points that are within a certain distance range of the first access point, of a quality of wireless communication of the end-user device with each access point of the set of access points, by wirelessly broadcasting information comprising the satellite-based coordinates of the first access point to the plurality of access points, process responses received from respective access points of the set of access points in response to the broadcast information, each received response comprising a measurement of a quality of a signal received by the respective access point from the end-user device, select one particular access point from the set of access points, based upon received responses to the broadcast information, transmit, to the particular access point, a notification requesting the particular access point to begin communication of the first end-user data with the first end-user device, and end, by the first access point, communication of the first end-user data with the first end-user device.

20. The system according to claim 19, wherein the plurality of access points comprises access points that are each at a respective fixed geographic location having satellite-based coordinates known to the respective access point, and access points installed in vehicles that are mobile and at a respective current geographic location having satellite-based coordinates known to the respective access point.

21. The system according to claim 19, wherein the network identifier is the same for all access points in the network of moving things.

22. The system according to claim 19, wherein the network identifier is unique to each end-user device being served by the network of moving things.

23. The system according to claim 19, wherein the network identifier comprises a Basic Service Set Identifier (BSSID) of an IEEE 802.11b, IEEE 802.11g, IEEE 802.11n, or IEEE 802.11ac protocol.

24. The system according to claim 19, wherein the network identifier is transferred to the particular access point when the broadcast of information is sent to the particular access point by the first access point.

25. The system according to claim 19, wherein a network address that comprises an Internet Protocol (IP) address is assigned to the end-user device by a node of the network of moving things that routes end-user data for a particular end-user device according to the IP address assigned to the particular end-user devices by the node.

26. The system according to claim 19, wherein each access point of the plurality of access points wirelessly shares satellite-based coordinates of a current geographic location of the access point with the remaining access points of the plurality of access points.

27. The system according to claim 19, wherein wireless communication between the plurality of access points and the plurality of end-user devices uses a first radio frequency channel and a first communication protocol, and wireless communication between the first access point and the set of access points uses a second radio frequency channel and a second communication protocol.

* * * * *